United States Patent [19]
Pearson

[11] Patent Number: 5,276,684
[45] Date of Patent: Jan. 4, 1994

[54] HIGH PERFORMANCE I/O PROCESSOR

[75] Inventor: Robert B. Pearson, Cold Spring, N.Y.

[73] Assignee: International Business Machines Corporation, Armonk, N.Y.

[21] Appl. No.: 734,359

[22] Filed: Jul. 22, 1991

[51] Int. Cl.⁵ .............................................. H04J 3/24
[52] U.S. Cl. .................................. 370/94.1; 395/275; 395/325; 370/85.1
[58] Field of Search ................. 370/94.1, 60; 395/325, 395/275, 425, 200, 250, 725, 400, 800

[56] References Cited

U.S. PATENT DOCUMENTS

| | | | |
|---|---|---|---|
| 4,400,778 | 8/1983 | Vivian et al. | 395/325 |
| 4,491,916 | 1/1985 | Vallhonrat | 395/325 |
| 4,513,390 | 4/1985 | Walter et al. | 395/275 |
| 4,516,199 | 5/1985 | Frieder et al. | 395/275 |
| 4,584,680 | 4/1986 | Carter et al. | 370/60 |
| 4,688,166 | 8/1987 | Schneider | 395/275 |
| 4,716,523 | 12/1987 | Burrus, Jr. et al. | 395/425 |
| 4,784,453 | 11/1988 | Shaw et al. | 385/24 |
| 4,807,121 | 2/1989 | Halford | 395/275 |
| 4,855,899 | 8/1989 | Presant | 395/275 |
| 4,860,003 | 8/1989 | Deluca et al. | 370/94.1 |
| 4,866,597 | 9/1989 | Kinoshita | 395/250 |
| 4,870,566 | 9/1989 | Cooper et al. | 395/325 |
| 4,974,150 | 11/1990 | Long et al. | 395/575 |
| 5,121,390 | 6/1992 | Farrell et al. | 370/94.1 |

FOREIGN PATENT DOCUMENTS

0226975A3 7/1987 European Pat. Off. .
0239937A3 10/1987 European Pat. Off. .

OTHER PUBLICATIONS

Supercomputers: Technology and Applications; G. J. M. Smit, P. G. Jansen; Microprocessing and Microprogramming vol. 24, 1-5; Zurich, Aug. 29-Sep. 1, 1988.

Primary Examiner—Douglas W. Olms
Assistant Examiner—Dang Ton
Attorney, Agent, or Firm—Perman & Green

[57] ABSTRACT

An I/O Processor (28) includes a two channel receiver (28b) and a two channel transmitter (28c) coupled to a high speed communications channel. For the receiver a status memory, specifically a FIFO (44a, 44b), stores structuring information that indicates the beginnings (SOP) and endings (EOP) of PACKETS, as well as, for each BURST of data words within a packet, an indication of the occurrence of the BURST and a length (L) of the BURST. Additionally, there is an indication for each BURST of the presence of any errors occurring during the BURST. A corresponding data FIFO (40a, 40b) contains only the received data words, without any structuring information. A device reads both of the FIFOS, subsequent to the reception of one or more PACKETS, so as to reconstruct the original format of the received data. For the transmitter a structure control FIFO (46a, 46b) stores the structuring information for an associated data FIFO (40c, 40d), the transmitted data being structured in accordance with the structuring information. The receiver and the transmitter each include a high speed internal data path (42a, 42b) and a lower speed data path (54a, 54b) which are coupled together during slave read and write cycles, and which are decoupled during high speed DMA cycles.

31 Claims, 11 Drawing Sheets

HIPPI RECEIVER DATA PATH ARCHITECTURE

HIPPI TRANSMITTER DATA PATH ARCHITECTURE

5,276,684

HIGH PERFORMANCE I/O PROCESSOR

CROSS REFERENCE TO RELATED PATENT APPLICATIONS

This patent application is related to the following commonly assigned U.S. patent applications Ser. No. 07/734,432, filed Jul. 22, 1991, entitled "Scientific Visualization System", D. Foster et al.; and U.S. patent application Ser. No. 07/734,206, filed Jul. 22, 1991, entitled "A Universal Buffered Interface for Coupling Multiple Processors, Memory Units, and I/O Interface to a Common High-Speed Interconnect" A. Garcia,

FIELD OF THE INVENTION

This invention relates generally to data communications and, in particular, to method and apparatus for providing high bandwidth data communications for a data processor system, such as a multiprocessor system.

BACKGROUND OF THE INVENTION

System requirements needed to interact with and visualize large, time-dependent simulation data sets include a large, high-bandwidth disk array to store the entire data set being processed, a high speed data communications network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

To realize such large and complex systems a multiprocessor approach may be taken, wherein a plurality of data processors operate in parallel on the same aspect or on different aspects of the same task.

An important consideration in such a multiprocessor system is the interfacing of the system to external data sources, such as supercomputers and high capacity disk arrays.

It is thus one object of the invention to provide an intelligent I/O Processor for coupling to high speed data communications channels.

It is another object of the invention to provide an I/O Processor that facilitates high speed direct memory accesses (DMA) to or from a shared global system memory over high speed interconnects.

It is a further object of the invention to provide an I/O Processor that facilitates the management of communication data information and structuring information for use with a communication protocol that employs packets of information bursts, such as an ANSI standard High Performance Parallel Interface (HIPPI).

SUMMARY OF THE INVENTION

The foregoing objects are realized by an I/O Processor that includes a receiver and a transmitter coupled to a high speed communications channel. For the receiver a status memory device, specifically a First In-First Out (FIFO) memory device, stores structuring information that indicates the beginnings (SOP) and endings (EOP) of packets, as well as, for each BURST of data words within a packet, an indication of the occurrence of the BURST and a length (L) of the BURST. Additionally, there is an indication for each BURST of the presence of any errors occurring during the BURST. A corresponding data FIFO contains only the received data words, without any structuring information. A device, such as an attached I/O data processor or communications controller, is enabled to read both of the FIFOS, subsequent to the reception of one or more PACKETS, so as to reconstruct the original format of the received data words.

For the transmitter a control structure FIFO is initially loaded, prior to a transmission, by the I/O data processor to store the structuring information that indicates SOP, EOP, BURST, and L for each BURST. A data FIFO is also initially loaded, preferably through a DMA mechanism, with the data words that correspond to the structuring information stored within the control structure FIFO. The transmitter operates to reconstruct the format of the transmitted data words by reading the control structure FIFO in conjunction with the unstructured data from the data FIFO. The control structure FIFO may also store a LINK bit with each control for causing consecutive control indications to be linked together.

The I/O Processor also includes, for the transmitter and for the receiver, a DMA control FIFO wherein a plurality of DMA commands may be stored and linked together to cause a plurality of DMA commands to be executed in sequence, without intervention by the I/O data processor.

The I/O Processor further includes, for the transmitter and for the receiver, a plurality of internal buses. One bus is a high speed data bus coupled to the data FIFOs that is used for transferring data, typically by DMA, to or from a global memory. Another bus is a slower speed data bus used for slave read/write cycles of I/O Processor registers and other logical devices. The two buses are coupled together during slave cycles and are decoupled during DMA cycles. During DMA cycles the data is transferred in a high speed manner over the high speed bus while the slower speed bus is used for transferring DMA-related command, status, and control information.

BRIEF DESCRIPTION OF THE DRAWING

The above set forth and other features of the invention are made more apparent in the ensuing Detailed Description of the Invention when read in conjunction with the attached Drawing, wherein:

FIG. 2b is a block diagram showing in greater detail a coupling of signals between the receiver and the transmitter of FIG. 2a;

FIG. 4 is a block diagram of the HIPPI receiver shown in FIG. 2a;

FIG. 5 is a block diagram of the HIPPI transmitter shown in FIG. 2a;

DETAILED DESCRIPTION OF THE INVENTION

Figure 1:
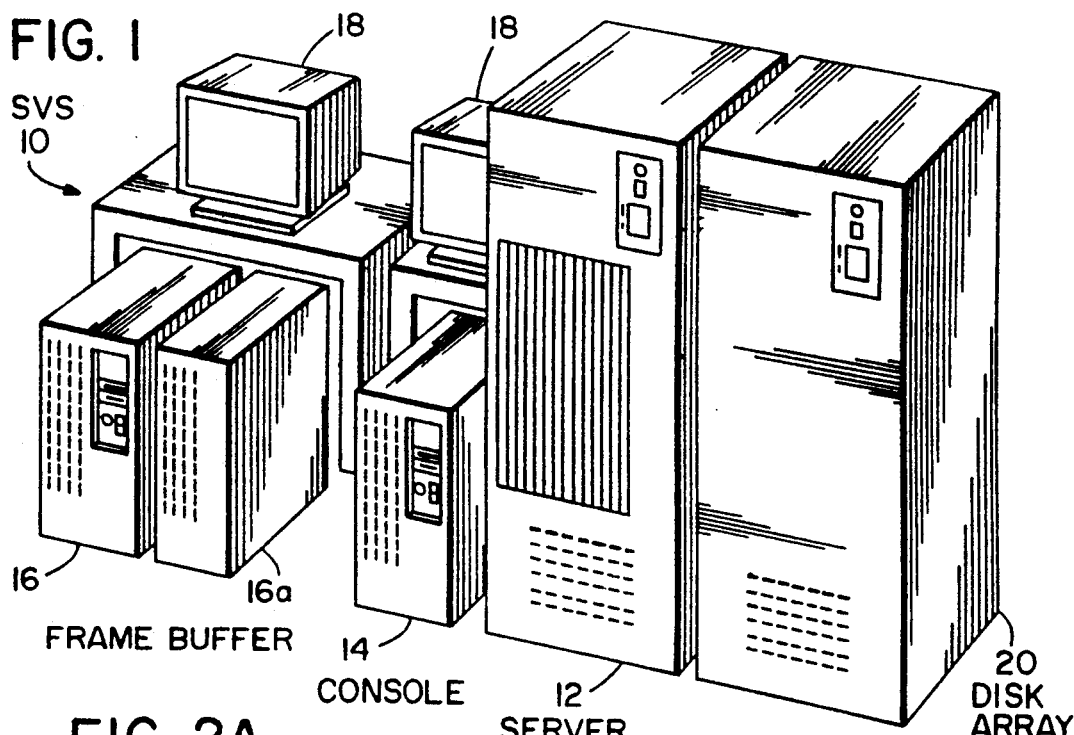
FIG. 1 illustrates system components of a scientific visualization system.

Referring to FIG. 1 there is illustrated a multiprocessor system that includes an I/O processor (IOP) that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application. Furthermore, and as will become apparent, the use of the I/O processor is not restricted to only this particular system. That is, the IOP as taught by the invention may be employed to advantage in a number of different types of multiprocessor systems.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console 14 embodied in, by example, a RISC System/6000 (RS/6000) data processing system manufactured by the International Business Machines Corporation (RISC System/6000 is a Trademark of the International Business machines Corporation). The console 14 provides network access from remote workstations (not shown).

A third component is a Frame buffer 16 that includes a RS/6000 data processor which provides console functions therefore. Frame buffer 16 includes interface and image buffering hardware 16a attached via an ANSI standard High Performance Parallel Interface (HIPPI) for providing real-time display capability to high-resolution displays 18. A further component of the system 10 is a disk array 20. Disk array 20 may be embodied within a storage system having 21 GByte capacity with 55 MByte/second transfer rate via a HIPPI interface.

It should be realized that the exact configuration of the system 10 varies depending on the intended use and that the configuration of FIG. 1 is not intended to represent a limitation upon the practice of the invention.

Figure 2A:
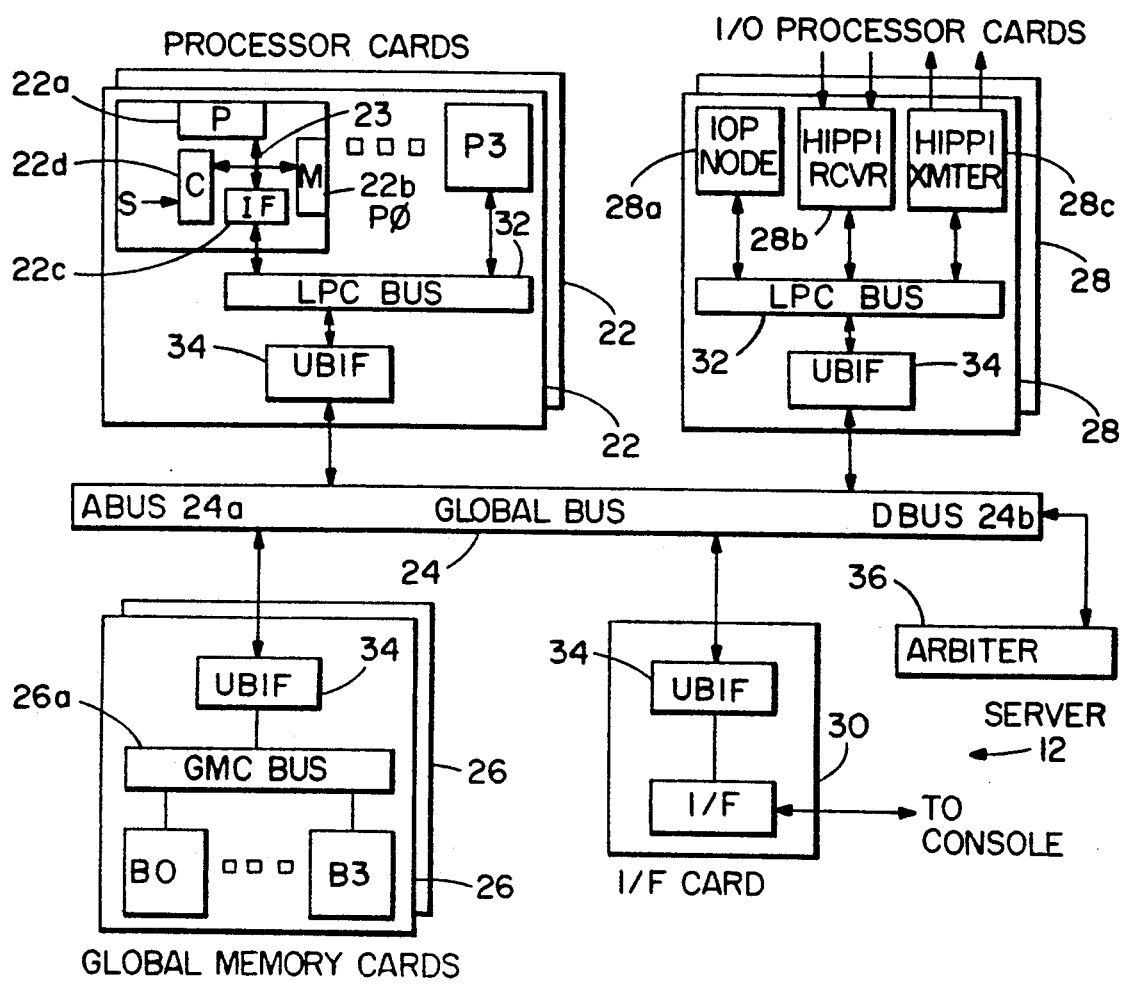
FIG. 2a is a block diagram of the system server component of FIG. 1.

Referring to FIG. 2a there is illustrated in block diagram form the server 12 of the SVS 10. Server 12 is comprised of a plurality of individual processors 22a organized as four processors (P0-P3) per printed circuit card 22. The server 12 may include up to eight cards for a total of 32 processors. Each processor card 22 includes a universal bus interface (UBIF) 34 for coupling a Local Processor Card (LPC) bus 32 to a SVS global bus 24. Also coupled to the SVS global bus 24 are a plurality of Global Memory cards 26, a plurality of I/O processor cards 28, and an interface 30 to the RS/6000 console 14.

More specifically, each processor card 22 includes up to four processor nodes each having a microprocessor 22a. In a present embodiment each microprocessor 22a is an i860-type device, specifically an 80860 microprocessor device manufactured by Intel Corporation (i860 is a Trademark of the Intel Corporation). Coupled to each microprocessor 22a through a node bus 23 is a local node memory 22b providing, in this embodiment, 16 megabytes (MB) of storage. Each processor node also includes a buffered interface 22c to the LPC bus 32. Additionally, each processor node includes an interface 22d to a serial bus (S). The LPC bus 32 connects multiple processor nodes to the UBIF 34 and also permits access to further shared resources.

In a present embodiment one of the processor cards 22 is capable of a peak performance of 160 million instructions per second (MIPS), or 320 million single precision floating point operations per second (MFLOPS). A fully configured system of eight processor cards 22 provides a peak performance approaching 1.28 billion instructions per second (BIPS) or 2.56 GFLOPS, assuming 40 MHz operation.

Also in a present embodiment each of the Global Memory cards 26 is configured with either 128 MB or 256 MB of random access memory with ECC. The server 12 may include up to four Global Memory cards 26. Each of the Global Memory cards 26 provides a data bandwidth of 640 MB/second in a manner that reduces a memory access latency seen by each user of the system 10. This is accomplished by partitioning the Global Memory on each memory card 26 into four memory banks (B0-B3), each of which is capable of independently performing block read cycles, page mode read or write cycles and random read or write cycles. A Global Memory Card (GMC) bus 26a enables each of the banks (B0-B3) to operate independently, while utilizing common global bus resources.

The I/O processor cards 28 each include a processor node 28a, similar to processor node 22a of the processor card 22, in addition to two HIPPI receivers 28b, and two HIPPI transmitters 28C. Each IOP 28 provides four HIPPI interfaces, each of which is capable of operation at a transfer rate of 100 MB/second. The HIPPI interfaces are employed to support high speed disk arrays, provide real-time images to HIPPI-attached frame buffers, and realize high speed communication with external devices, such as supercomputers. The I/O processors 28 are described in detail below.

The console interface 30 is partitioned into two cards, one which is found within the server 12 and one which resides in the console 14. The link between the two card allows access to the Global memory 26 and serial bus, which in turn allows access to each processor's local memory and PBIF.

The system 10 also includes an Arbiter 36 that is coupled to the Global Bus 24 and which operates to arbitrate requests for the Global Bus between the processors 22, the memory 26, console interface 30, and the I/O processors 28.

The Global Bus 24 is implemented with Emitter Coupled Logic (ECL) technology for interconnecting these various components and providing a 1.28 GByte/sec transfer rate.

Each SVS 10 server 12 supports up to 12 master devices (i.e. processor cards 22, I/O processor cards 28, or Interface card 30), and up to four memory cards 26. One possible configuration includes an Interface card 30, eight processor cards 22 (or 32 processors), four Global Memory cards 26 each with 256 MBytes of storage for a total of 1024 MB of high speed memory, and one I/O processor 28 to support the high speed disk array 20, receive data from a HIPPI source, and distribute image data to HIPPI attached frame buffers 16. The console 14 provides a user interface to the SVS 10 as well as support for standard I/O devices.

As can be seen in FIG. 2a each component card of the system 10 includes one of the UBIFs 34. The UBIF 34 presents a shared, synchronous, decoupled interface to the Global Bus 24, provides local arbitration for the LPC bus 32 or GMC bus 26a, and performs all necessary handshaking and retry sequencing with the Global bus 24. In a present embodiment the UBIF 34 provides bidirectional, pipelined buffering in support of to four local master devices, such as processors 22a, or up to four slave devices, such as the memory banks B1-B4. The UBIF 34 supports data bus widths between eight bits and 256 bits and provides a peak data transfer rate of 1.28 Gbytes/second between the Local Bus 32 and the Global Bus 24, assuming 40 MHz bus operation (25 nanosecond bus cycle).

For the I/O processor cards 28 the associated UBIF 34 provides an input and an output data queue for the processor 28a (Queues 0), an input and an output data queue for the HIPPI receiver 28b (Queues 2), and an input and an output data queue for the HIPPI transmitter 28c (Queues 3). UBIF 34 input and output queues (1) are presently not used. An aspect of the invention is a sharing of the transmitter's 28c UBIF 34 output queue by the receiver 28b for DMA cycles, and a sharing of the receiver's 28b UBIF 34 input queue by the transmitter 28c for DMA cycles. This aspect of the invention is described in greater detail below.

In accordance with the present invention the I/O processor cards 28 each include a processor node 28a, similar to the processor card 22, plus two HIPPI transmitters 28c, and two HIPPI receivers 28b. Each IOP 28 thus provides four HIPPI interfaces, each of which is capable of operation at a transfer rate of 100 MB/second. The two receives channels 28b and the two transmitters channels 28c operate independently to deliver 100 Mbytes/second each. The HIPPI interfaces are employed, by example, to support high speed disk arrays, provide real-time images to HIPPI-attached frame buffers, and provide high speed communication with external devices, such as supercomputers.

The HIPPI communications channels conform electrically and logically to a specification entitled "High-Performance Parallel Interface Mechanical, Electrical, and Signalling Protocol Specification (HPPI-PH)" preliminary draft proposed, American National Standard for Information Systems, Nov. 1, 1989, X3T9/88-127, X3T9.3/88-032, REV 6.9, the disclosure of which is incorporated by reference herein.

Figure 3:
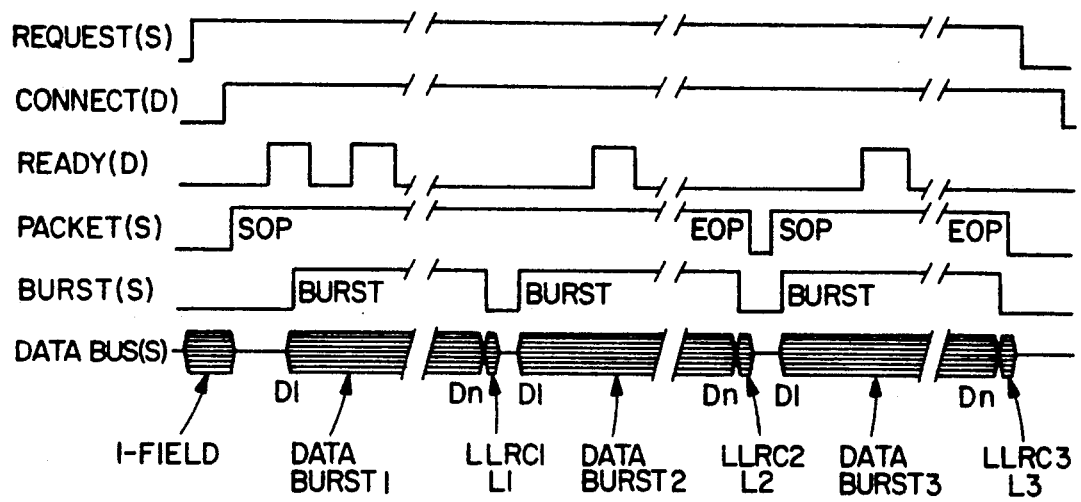
FIG. 3 illustrates communications channel signals during the transmission of three data bursts.

FIG. 3 is an illustrative timing diagram showing a synchronous transfer of three data bursts from a source (S) to a destination (D). Each data burst has associated therewith a length/longitudinal redundancy check-word (LLRC) that is sent from the source to the destination on a 32-bit data bus during a first clock period following a data burst. Packets of data bursts are delimited by a PACKET signal being true. The BURST signal is a delimiter marking a group of words on the HIPPI data bus as a burst. The BURST signal is asserted by the source with the first word of the burst and is deasserted with the final word. Each burst may contain from one to 256 32-bit data words. A burst having less than 256 words is considered to be a "short burst". A packet is defined to contain no more than one short burst, which may be either the first or last burst of a packet. A REQUEST signal is asserted by the source to notify the destination that a connection is desired. The CONNECT signal is asserted by the destination in response to a REQUEST. One or more READY indications are sent by the destination after a connection is established, that is, after CONNECT is asserted. The destination sends one ready indication for each burst that it is prepared to accept from the source. A plurality of READY indications may be sent from the destination to the source to indicate a number of bursts that the destination is ready to receive. For each READY indication received, the source has permission to send one burst. Not shown in FIG. 3 is a CLOCK signal defined to be a symmetrical signal having a period of 40 nanoseconds (25 MHz) which is employed to synchronously time the transmission of data words and the various control signals.

As in the case of the processor nodes 22a the IOP 28 includes the 600 MByte/sec local on-card bus (LPC 32). The LPC bus 32 includes a 256-bit data bus (LPC D) 32a and a 32-bit address bus (LPC A 32b). A description of the LPC bus 32 signals is found in Appendix A. Several logical units are attached to the LPC bus 32. As seen in FIG. 2a, these logical units include the UBIF 34 and the local processor node 28a, which includes 16 megabytes of private memory. Also attached to the LPC bus 32 are the two HIPPI receivers 28b and the two HIPPI transmitters 28c.

Figure 4:
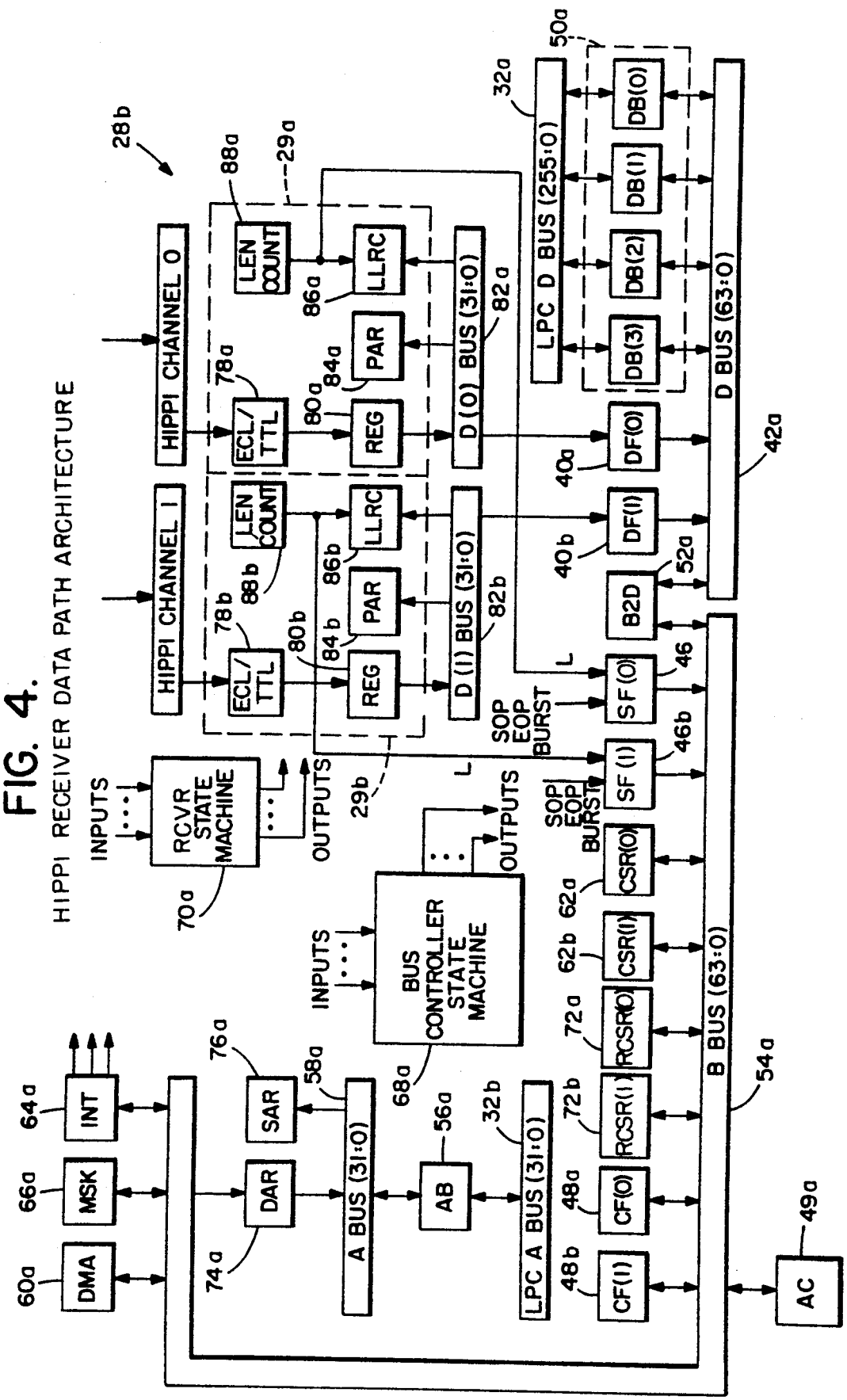

As seen in FIGS. 3 and 4 each of the two, two-channel HIPPI interfaces 28b and 28c has the same overall organization. The two independent HIPPI interfaces, receiver or transmitter, convert data between the differential ECL signals used on the HIPPI interface and the TTL/CMOS levels used internally within the IOP 28. The interfaces 28b and 28c also implement the specified state machines that control the signalling between a HIPPI receiver and transmitter regarding the establishment of connections and the management of data buffers.

The data is transferred to or from data FIFOs (40a, 40b, 40c, 40d), each of which has two independent clocks enabling the synchronization of the 25 MHz frequency of the HIPPI interfaces and the nominal 40 MHz clock rate of the SVS 10. The FIFOs 40a-40d also perform the function of matching the 32-bit width of the data on the HIPPI channel and the 64-bit width of an internal interface 28b or 28c data bus (DBUS) 42a and 42c, respectively.

In addition to the data FIFOs 40a-40d there are two other FIFOs for each of the four HIPPI channels. One of these stores structure information concerning the communication data stream. As was stated, the HIPPI specification enables data to be sent in packets which consist of one or more bursts, with each burst containing up to 256 data words. In the HIPPI receiver interfaces 28b the incoming data is split into (a) data and (b)

structure information. The data is written into the data FIFOs 40a and 40b and the structure information is written into status FIFOs 44a and 44b.

Figure 6A:
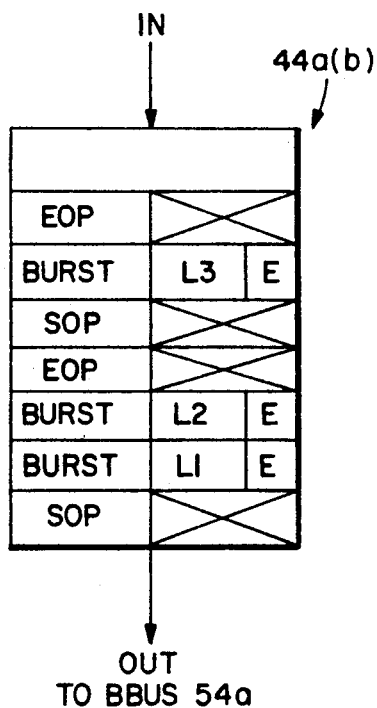
FIG. 6a shows the content of a receive status FIFO at the termination of the communications sequence shown in FIG. 3.
Figure 6B:
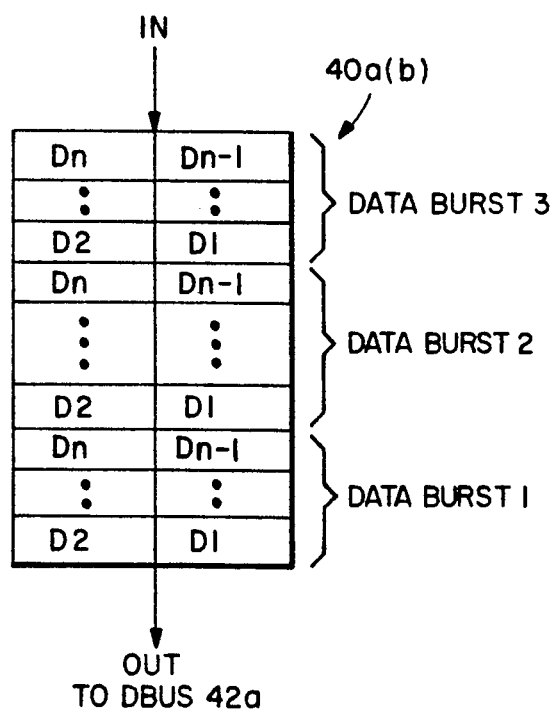
FIG. 6b shows the content of the receive data FIFO at the termination of the communications sequence shown in FIG. 3.

As is shown in FIG. 6a the status FIFOs 44 contain entries that indicate the beginnings (SOP) and endings (EOP) of packets, as well as, for each burst, the length (L) of the burst. Additionally, there is an indication for each burst of the presence of any errors (E) in the burst. As seen in FIG. 6b, the corresponding data FIFO 40a or 40b contains only received data, without any structuring information.

In the transmitter interface 28c the structure information for a given channel is first stored within Structure Control FIFOs (SCF) 46a or 46b by the local processor 28a. This structure information is subsequently read out of the appropriate FIFO 46a or 46b by the HIPPI transmitter interface and is used to structure data which is read by the transmitter interface 29c and 29d, from the data FIFO 40c(d), into packets of bursts of specified length. There is a stored record in the SCF 46a(b) containing entries that indicate the beginnings and endings of packets, as well the length of each burst. For the transmitter interface 28c the SCF 46 also contains a bit which is used to link together the execution of the controls contained in the FIFO 46, once the HIPPI transmitter begins operation it continues to read controls from the appropriate one of the SCFs 46, and data from the associated data FIFO 40c or 40d, as long as the controls are linked together by the link bits.

A third FIFO for each channel is employed to store DMA commands, and is referred to as a command FIFO (CF) 48. Each DMA command specifies the transfer of from one to 256 bursts, of length 256 words, between Global memory 26 and the associated HIPPI channel. The CFs 48a, 48b, 48c and 48d store 1024 commands and, for each command, store a starting block address, a length in full bursts, and bits which indicate whether to link the execution of successive commands and whether to interrupt the I/O processor 28a upon the completion of the command. The CFs 48 thus provide a mechanism that enables DMA operation over a number of consecutive DMA commands.

Other elements of the two channel receiver 28b or transmitter 28c include a 256 bit registered bidirectional data buffer DB 50 which functions as an interface between the LPC data bus 32a and the 64-bit private data bus (DBUS) 42. In accordance with an aspect of the invention a bidirectional transceiver 52a couples the DBUS 42 to a further 64-bit data bus referred to as the BBUS 54a. As can be seen, the DBUS 42a is not as heavily loaded as the BBUS 54a (seven bus loads as compared to 13) and is thus inherently capable of higher speed operation. The higher speed DBUS 42a has the data FIFOs 40 coupled thereto for transferring during DMA cycles, in a high speed manner, data to or from the LPC DBUS 32a. For non-DMA accesses (slave cycles), such as processor 28a read or write accesses to components on the DBUS 54a, the transceiver B2D 52 couples the DBUS 42 to the BBUS 54.

Thus, in accordance with a further aspect of the invention there is provided an I/O processor that includes a high speed internal bus for transferring communication data and a lower speed internal bus for transferring command, status, and control information. Furthermore, while communication data is being transferred to or from the data FIFOs 40 B2D 52b isolates the BBUS 54 from the DBUS 42, enabling DMA command, address, and sequencing information to be simultaneously transferred between logical units coupled to the BBUS 54.

The receiver and transmitter interfaces also include an address buffer AB 56 for bidirectionally coupling the LPC ABUS 32b to an internal address bus (ABUS) 58.

Figure 5:
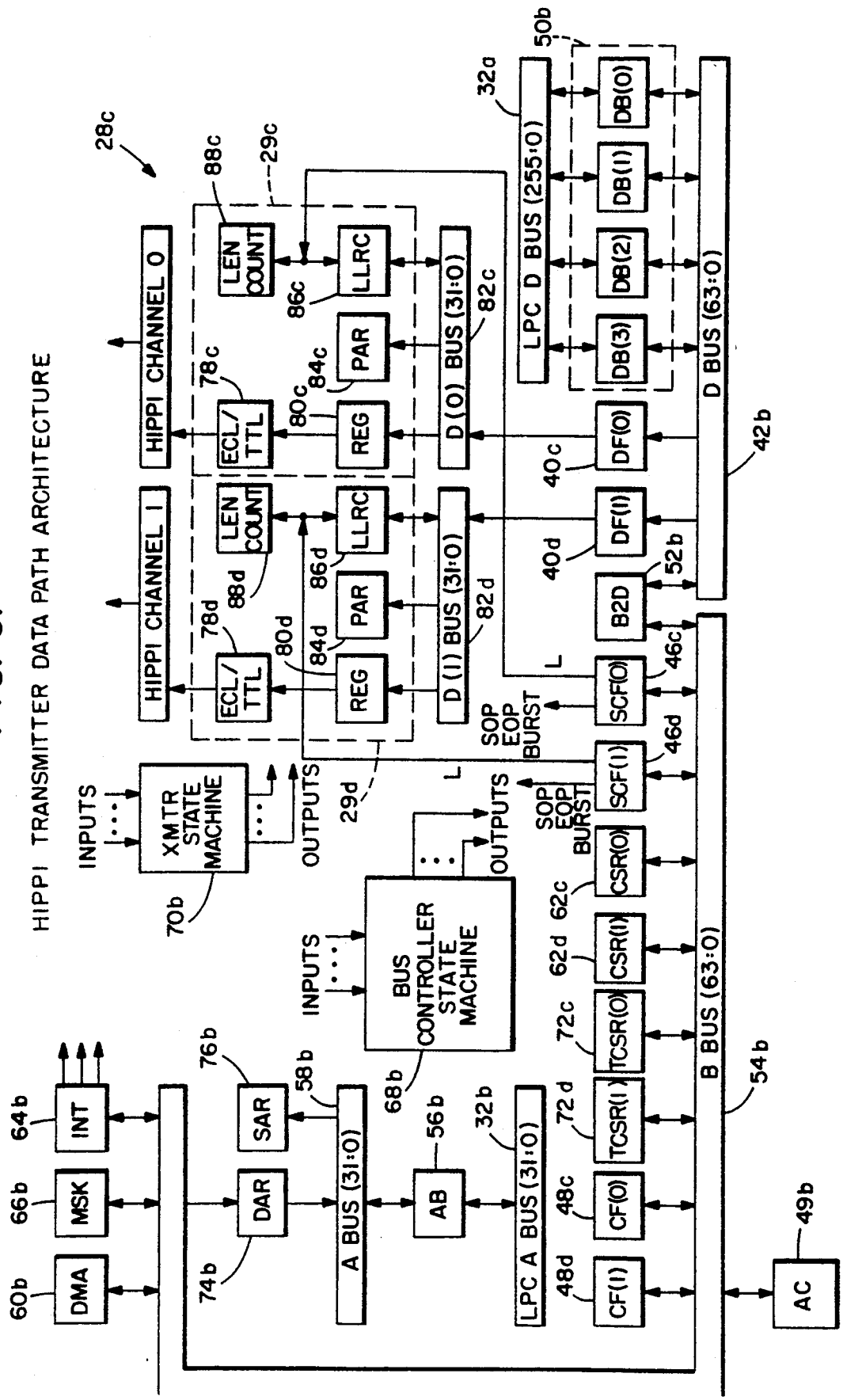

Other components shown in FIGS. 4 and 5 are described in detail below.

RECEIVER 28b

A more detailed description of the operations of the HIPPI receiver (HPR) 28b is now provided. The overall data path architecture of the HPR 28b is shown in FIG. 4. The HPR 28b provides two HIPPI receiver channels. The purpose of the HPR 28b is to enable data transferred from one or two external HIPPI transmitters to be received into Global memory 26 by DMA transfer, or to be read out by the processor 28a using memory mapped I/O accesses. Additional features of the HPR 28b provide support for the implementation of the HIPPI specification by combined hardware and software mechanisms, allow for the efficient control of the interface so that a minimum of processor 28a intervention is required to effect a transfer, to allow for the transfer of data at the full 200 MB bandwidth of the two channels, to allow for the recovery from error conditions, and to enable diagnostic testing of the interface.

The HPR 28b is partitioned into two independent HIPPI receiver sections 29a and 29b which provide the electrical interface to the HIPPI channels and which implement the specified control sequences and connection and buffer management policies.

With respect to the LPC 32 the HPR 28b is both a master for DMA memory writes to Global Memory 26 and a slave for control register reads and writes by processor 28a. By means of slave operations the processor 28a is enabled to reset the interface, to read status and write control registers, to read data from data FIFOs 40a and 40b which has been received from each of the channels, to store a channel program within CF 48 to control the operation of a DMA sequencer state machine, and to recover the structure of received data in accordance with the structure information within SFs 44. As a bus master, by means of DMA transfers, the HPR 28b transfers blocks of received data, via LPC 32 and UBIF 34, directly into Global memory 26 under the control of a sequence of DMA commands stored in command FIFOs 48a and 48b, in conjunction with a DMA register 60a and other logical units. DMA block transfers are multiples of 1024 bytes and transfer data to blocks of Global memory 26 that are aligned on 1KB boundaries. DMA transfers for the two HIPPI channels are interleaved on a block by block basis (blocked multiplexed). If both channels 29a and 29b are simultaneously active they alternately transfer 1KB blocks.

As data is received by the two receiver sections 29a and 29b the data is stored into the corresponding data FIFOs 40a and 40b, respectively, without any indication of how the data was originally organized. In order to enable the subsequent reconstruction of the data, each receiver also writes into the status FIFOs 44a and 44b a sequence of status words indicating variously the start of a packet, each burst contained within the packet, with the length of burst in 32-bit words, an error indication for the burst, and an end of a packet. The contents of each status FIFO 44 are readable through the slave interface or each may be automatically read by a DMA sequencer state machine, described in detail below, over the BBUS 54a and compared against the DMA commands stored in the associated command FIFO 48, stopping in the event of an error or a mismatch.

The HPR 28b slave interface provides for the reading and writing of the various control and status registers that implement the interface described above. Each of these registers is described in detail below.

An overview is now given of the control registers. The addressable facilities of the HPR 28b are memory mapped in a physical address block of the address space of the processor 28a. Addressable objects include normal registers and pseudo-registers, such as FIFO buffers, interrupt registers, and reset registers, which do not have conventional memory semantics but which support read-like and write-like operations. The processor 28a addressable registers are summarized in Table 1.

TABLE 1

| NAME | DESCRIPTION |
| --- | --- |
| DMA 60a | DMA control and status register (CSR) |
| CSR0 62a | HIPPI channel 0 CSR |
| CSR1 62b | HIPPI channel 1 CSR |
| INT 64a | Interrupt source register |
| MSK 66a | Interrupt mask register |
| CF0 48a | Channel 0 command FIFO |
| CF1 48b | Channel 1 command FIFO |
| SF0 44a | Channel 0 status FIFO |
| SF1 44b | Channel 1 status FIFO |
| DF0 40a | Channel 0 data FIFO |
| DF1 40b | Channel 1 data FIFO |

More specifically, the receiver DMA register 60a provides control and status information for the LPC bus 32 interface and DMA controller. A portion of this register determines the mode of DMA operation. Specifically, one bit, if set,, enables the DNA transfer of data to Global Memory 26 from either receiver channel 29a or 29b that is READY. Two bits are used to enable the reading and staging for execution of DMA commands for a particular one of the channels. Another bit enables Processor ID (PID) sharing for DMA Global Memory 26 writes. If this bit is set, alternate writes to the Global Memory 26, via the UBIF 34 data queues, use Write Request-2 (WREQ<2>) and Write Request-3 (WREQ<3>). If this bit is cleared all Global Memory 26 writes use WREQ<2>. This aspect of the invention regarding PID sharing is described in further detail below.

Another bit of the DMA register 60a enables a flow mode for DMA command execution. If set, each DMA command executed from the command FIFOs 48a and 48b requires a corresponding status word in the status FIFOs 44a and 44b that matches the command. Both FIFOs 44 and 48 are read simultaneously. If this bit is not set DMA commands are executed independently of the contents of the status FIFOs 44.

In addition to the foregoing, the DMA register 60a also contains a five bit read/write field that is used to provide the high order five bits of the physical memory address for DMA Global Memory 26 write data. These additional -address bits are employed to address beyond the four GByte limit imposed by the 32-bit byte address of the ABUS 58.

Eight bits of the DMA register 60a provide status concerning the DMA controller, while four bits provide information concerning the status flags of the data FIFO 40 and command FIFO 48. These flags include a FULL flag, a HALF FULL flag, an ALMOST EMPTY flag, and an EMPTY flag.

Several other bits provide strobes when a corresponding bit is written with a one. These strobes enable the starting of a DMA operation for either of the channels.

The RCSR(O) 72a and RCSR(L) 72b provide control and status for the HIPPI receivers 29a and 29b. Specifically, certain of these bits are programmed to enable the corresponding receiver to respond to an external transmitter, which has asserted REQUEST, by asserting the CONNECT signal. Reference is again made to the timing diagram of FIG. 3. Another bit, if set, enables the receiver to establish the connection. If not set, the receiver performs a reject sequence by asserting the CONNECT signal for four cycles and then deasserting the signal, other bits enable the receivers to send one or more READY indications to the external transmitter, other bits of this register, when read, provide an indication of the current state of the control signals on the associated HIPPI channel. These control signals include REQUEST, CONNECT, PACKET, BURST, and READY. Further bits of this register provide full and empty flags for the status FIFOs 44a and 44b.

The RCSR registers 72a and 72b also contain a number of bits that indicate error conditions. These include received data parity error conditions, LIRC errors, length errors, and ready errors.

The INT register 64a and the MASK register 66a provide control over the generation of interrupts to the local processor 28a and also provide status concerning interrupts which have been asserted. These interrupts include a RING interrupt which indicates that an attached transmitter has asserted the REQUEST signal. The above mentioned error conditions also generate an ERROR interrupt.

The DMA command FIFOs CF(O) 48a and CF(1) 48b are each also partitioned into a plurality of fields. For each FIFO storage location eight bits define a repeat count field. Each command may be executed a plurality of times (1-256), as indicated by the content of the repeat count field. Another field contains bits DMA, LINK, and INTR. If the DMA bit is set there is indicated a command that is a data transfer command. If this bit is not set the command functions as a NO-OP, except that the LINK and INTR bits are still operational. If set, the LINK bit indicates that upon completion of a current command that the next command should be executed automatically without restarting the channel DMA controller. The use of this bit thus enables the automatic execution of a plurality of consecutive DMA commands without intervention. The INTR bit, when set, causes a DMA completion interrupt to be generated upon the successful completion of the associated command.

Twenty-two bits of each command FIFO 48 location contain a portion of the address used for the DMA transfer. In that all DMA transfers begin on a 1024 byte boundary, the low order 10 bits of the DMA address are implicitly zero. The high order five bits of the DMA address are provided, as previously mentioned, from the DMA register 60a. During a DMA transfer to Global Memory 26, the address of a 32-byte memory word (256-bits) is provided from a separate address counter (AC) 49a, that is loaded from the DMA register 60a (5-MSB bits) and the command FIFO 48.

As was previously described, the Status FIFOS, SF(O) 44a and SF(1) 44b, contain status bits which describe the structure of the received data. As seen in FIG. 6a, these FIFOs contain a BURST indication, a SOP indication, an EOP indication, and a length of a received BURST. An error indication is also provided to indicate if a given BURST was received with errors, such as parity or LLRC errors.

The Data FIFOS, DF(O) 40a and DF(l) 40b, are each written by the associated HIPPI receiver 29 as data is received over the attached HIPPI channel. The FIFOs may be read under software control either 64-bits or 256-bits at a time., These FIFOs are also read and their contents written to the Global Memory 26 by the DMA controller, via DBUS 42a, LPC bus 32, UBIF 34, and Global Bus 24. The DFs 40a and 40b each store from zero to 8,192 bytes of data.

In addition to the addressable registers shown in Table 1 the HPR 28b includes a plurality of non-addressable registers which are loaded and read-out by control lines generated by state machines. Specifically, the HPR includes a bus controller state machine (BCSM) 68a and a pair of HIPPI receiver state machines (HRSM) 70a (only one of which is shown in FIG. 4). Each HIPPI receiver channel 29a and 29b is controlled by an associated one of the HRSM 70a state machines. Each HRSM 70a implements the specified HIPPI protocols so as to control the connection to and the reception of data from external HIPPI sources. The BCSM 68a has outputs coupled to various ones of the registers and controls the operation and linking of the DBUS 42a and the BBUS 54a for both DMA and programmed I/O reads and writes, and also generally controls the sequencing of DMA operations. The operation of various constituent state machines of the BCSM 68a are described in further detail below.

The non-addressable registers, and other logical elements shown in FIG. 4, include the following as described in Table 2.

TABLE 2

| NAME | DESCRIPTION |
|---|---|
| RCR0 72a | Channel 0 repeat count register used for DMA, includes a DMA block counter |
| RCR1 72b | Channel 1 repeat count register used for DMA, includes a DMA block counter |
| DAR 74a | DMA address register |
| SAR 76a | Slave address register |
| B2D 52a | Bidirectional bus transceiver |
| DB 50a | Four, 64-bit bidirectional data buffers that interface the 64-bit DBUS 42b to the 256-bit LPC DBUS 32a |
| AB 56a | 32-bit address buffer that interfaces the internal A bus 58a to the LPC A bus 32b |
| E/T 78a | Channel 0 ECL/TTL converter |
| E/T 78b | Channel 1 ECL/TTL converter |
| REG 80a | Channel 0 input 32-bit register |
| REG 80b | Channel 1 input 32-bit register |
| D(0) BUS 82a | Channel 0 32-bit data bus |
| D(1) BUS 82b | Channel 1 32-bit data bus |
| PAR 84a | Channel 0 parity checker |
| PAR 84b | Channel 1 parity checker |
| LLRC 86a | Channel 0 LLRC generator/checker |
| LLRC 86b | Channel 1 LLRC generator/checker |
| LEN 88a | Channel 0 burst length counter |
| LEN 88b | Channel 1 burst length counter |

TRANSMITTER 28c

Having described the operation of the HIPPI receivers 28b a description is now made of the HIPPI transmitters (HPT) 28c. As can been seen by a comparison of FIGS. 4 and 5 the transmitter architecture is fundamentally identical to that of the receiver. The HPT 28c also includes a bus controller state machine (BCSM) 68b and a pair of HIPPI transmitter state machines (HTSM) 70b (only one of which is shown in FIG. 5). Each HIPPI transmitter channel 29c and 29d is controlled by an associated one of the HTSM 70b state machines. Each HTSM 70b implements the specified HIPPI protocols so as to control the connection to and the transmission of data to external HIPPI receivers. The BCSM 68b has outputs coupled to various ones of the registers and controls the operation and linking of the DBUS 42b and the BBUS 54b for both DMA and programmed I/O reads and writes, and also generally controls the sequencing of DMA operations.

Figure 7A:
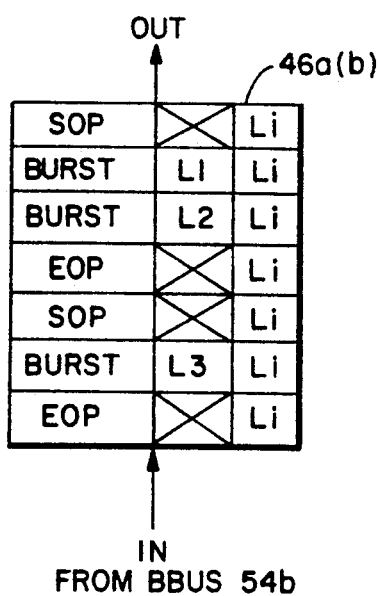
FIG. 7a shows the content of a transmit control FIFO at the beginning of the communications sequence shown in FIG. 3.

One difference between the HPR 28b and the HPT 28c is in the use of the Structure Control FIFOs (SCF) 46c and 46d which provide structuring information to the HIPPI transmitters 29c and 29d, respectively. As seen in FIG. 7a the SCFs 46c and 46d store the structuring information (SOP, BURST, BURST length (L), and EOP) and also store LINK (Li) information to indicate that successive commands are linked, that is, intended to be automatically executed in sequence.

In general, the various bits referred to above in the addressable registers of the receiver 28b have their transmitter-analogs in the transmitter registers. For example, the DMA register 60b includes bits to enable the reading and staging for executing transmitter DMA commands for each of the channels. DMA register 60b also contains a bit that enables the flow mode for DMA command execution, other bits contain the five bit extended address used for DMA Global Memory 26 reads, as opposed to Global Memory 26 writes for the receivers 28b. The CSR(O) 62c and CSR(L) 62d registers contain bits for establishing connections with external HIPPI receivers. For example one of the bits, if set, enables the assertion of a connection REQUEST by the associated transmitter channel. Another bit, which is read only, indicates whether the attached receiver has accepted or rejected a connection request. Another bit enables the execution of control words from the SCF 46 by the transmitters 29c and 29d.

With respect to the LPC bus 32, the HPT 28c is both a master for DMA Global Memory 26 reads and a slave for control register reads and writes by the processor 28a. By means of slave operations the processor 28a may reset the interface, may read status and write control registers, may write the data which is to be sent by each of the channels, may store a 'channel program' to control the operation of the DMA controller (embodied in the BCSM 68b), and may specify the structure of the data to be sent as packets consisting of bursts. As a bus master, by means of DMA transfers, the HPT 28c transfers blocks of data directly from Global Memory 26, under the control of a sequence of DMA commands stored in the command FIFOs 48c and 48d, and in conjunction with the DMA register 60b. DMA block transfers are in multiples of 1024 bytes and transfer the data from blocks of Global Memory 26 that are aligned on 1KB boundaries. DMA transfers for the two channels 29c and 29d are interleaved on a block by block basis (block multiplexed). As in the receiver 28b, if both channels 29c and 29d are active, then they transfer alternate 1024 byte blocks.

Figure 7B:
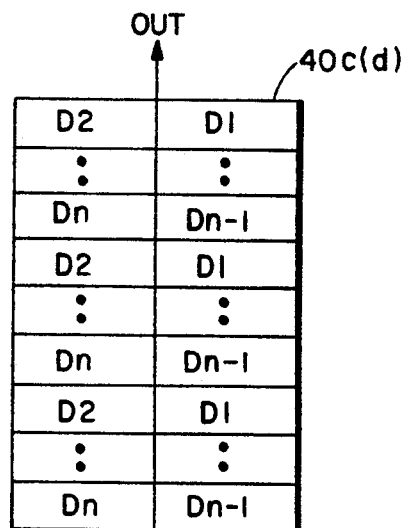
FIG. 7b shows the content of the-transmit data FIFO at the beginning of the communications sequence shown in FIG. 3.

As data is sent from the two transmitters 29c and 29d data words are read out from the data FIFOs 40c and 40d, respectively (FIG. 7b). As was previously stated, the data stored in these FIFOs does not contain any indication of how the data should be organized. However, the transmitter 29c also reads from the SCFs 46c and 46d the sequence of structure control words which indicate variously the start of a packet, each burst contained in the packet, with its length, and the end of a packet. The HIPPI transmitters 29c and 29d structure the outgoing data in accordance with the information contained within the SCFs 46c and 46d. The contents of the SCFs 46c and 46d are writeable through the slave interface or, in accordance with an aspect of the invention, can be automatically written by the DMA controller as DMA commands are completed. This feature is referred to the aforementioned FLOW mode.

STATE MACHINES

Having described the register structure of the receiver interface 28b and the transmitter interface 28c a description is now provided of the control mechanisms therefore. The description is given in the context of the receiver BCSM 68a, it being realized that the transmitter BCSM 68b operates in a similar fashion in transmitting data to an external HIPPI receiver.

Figure 8:
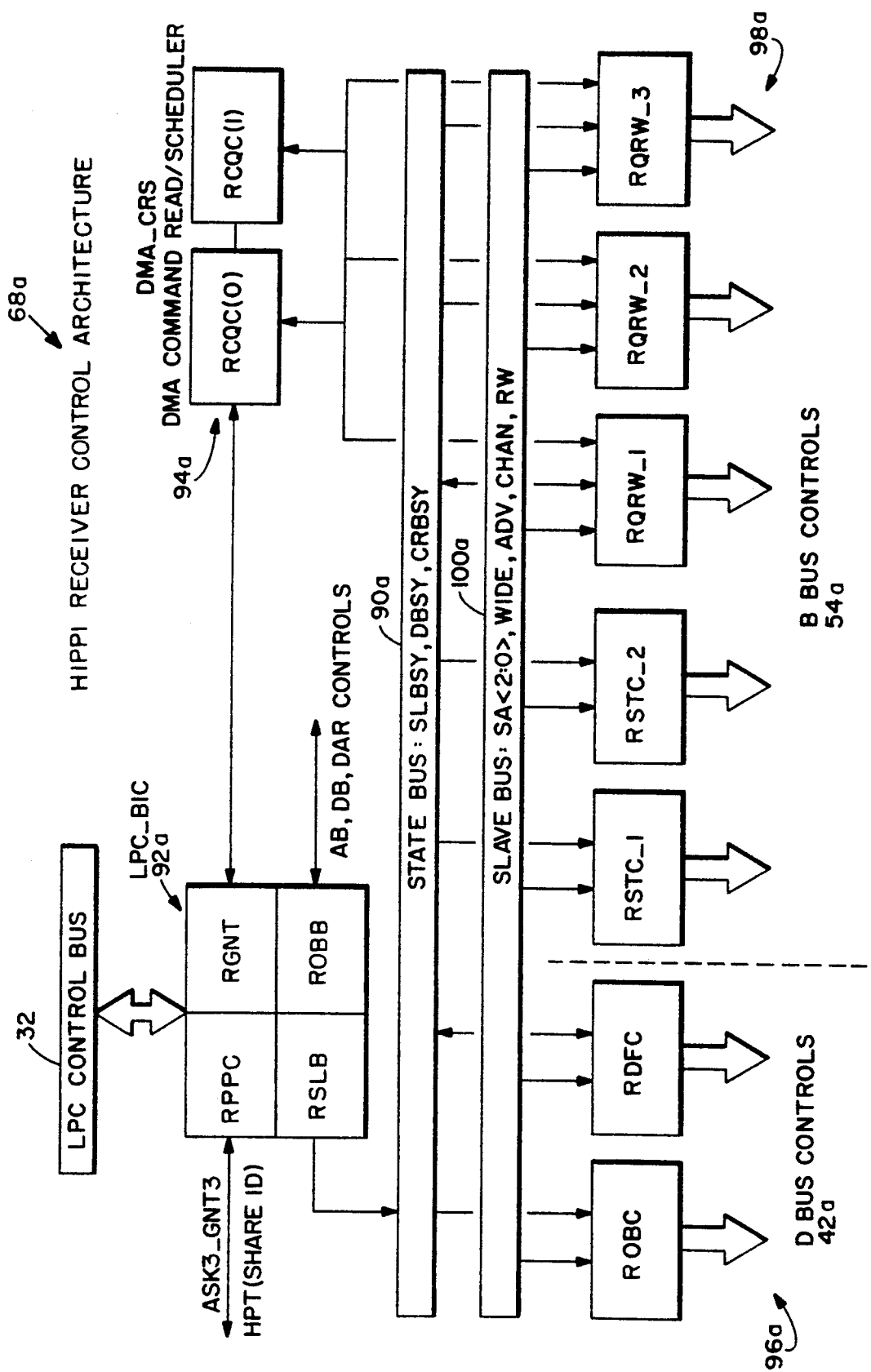
FIG. 8 illustrates receiver control logic and, in particular, a plurality of state machines that implement the Bus Controller State Machine of FIG. 4.
Figure 9:
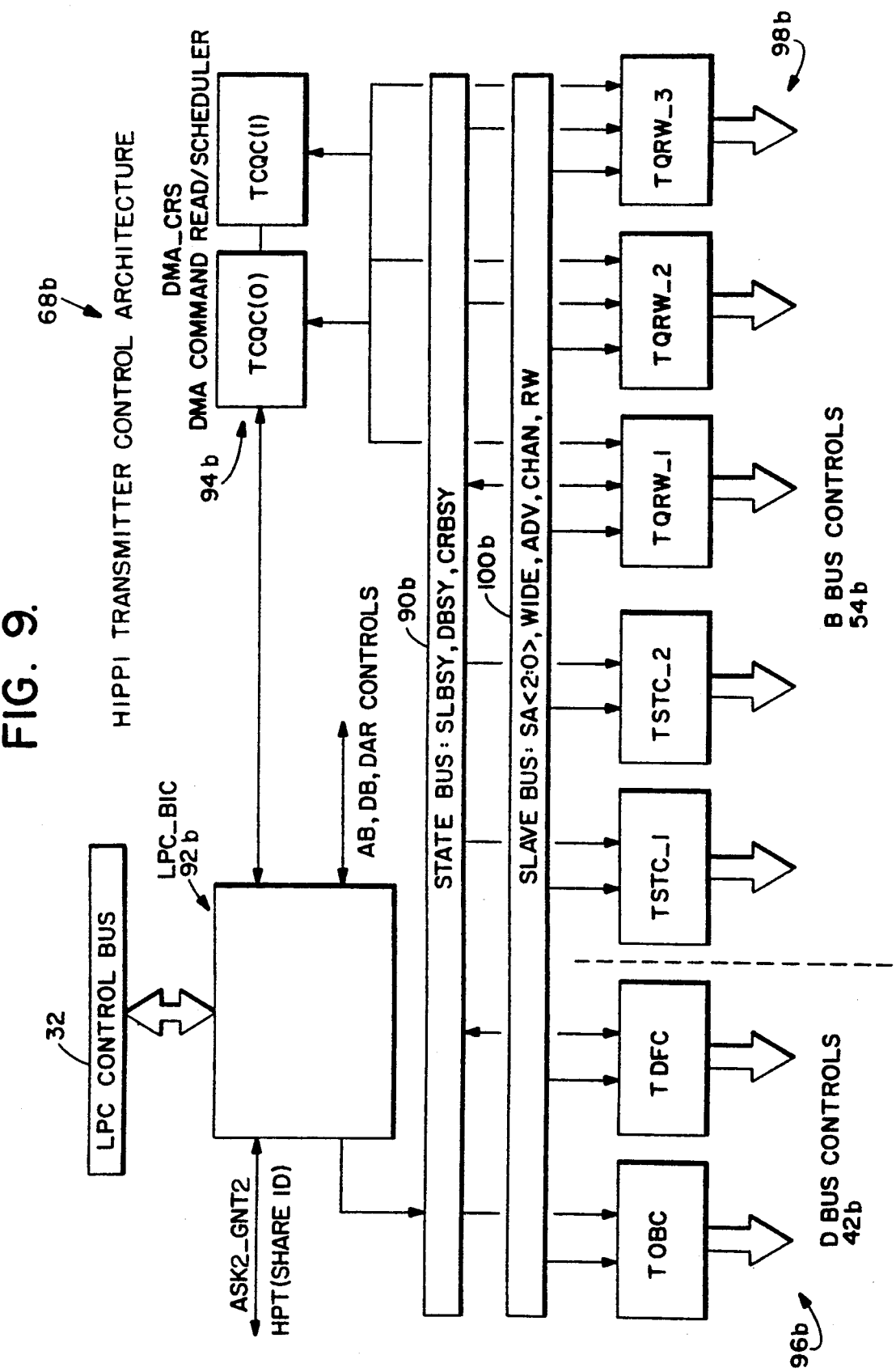
FIG. 9 illustrates transmitter control logic and, in particular, a plurality of state machines that implement the Bus Controller State Machine of FIG. 5.

Referring to FIG. 8 there is illustrated a plurality of state machine devices linked together by a state bus 90a. Specifically, there is illustrated an LPC bus 32 interface controller LPC_BIC 92a, a DMA command read/-scheduler DMA_CRS 94a, a DBUS controller 96a for controlling the operation of the DBUS 42a, and a BBUS controller 98a for controlling the operation of the BBUS 54a. The illustrated structure is hierarchical in nature, with the LPC_BIC 92a and DMA_CRS 94a being considered an upper level control section and the DBUS controller 96a and BBUS controller 98a being considered a lower level. During DMA transfers the DMA_CRS 94a provides signals to the DBUS controller 96a and BBUS controller 98a to control the data buses for writing data over DBUS 42a to Global Memory 26 and for controlling the flow of DMA status and control information on BBUS 54a.

Two sets of signals control the actions of the lower level control section. The first is comprised of a set of STATE signals SLBSY, DBSY, and CRBSY.

SLBSY is asserted whenever a valid read or write slave cycle, having an address corresponding to the HPR 28b, is detected. This signal is asserted by the LPC_BIC 92a constituent block RSLB. This signal is held until near the end of the completion of the slave cycle. That is, this signal being asserted implies that a slave cycle is pending or is active and is used to inhibit the latching of new slave addresses into the slave address register (SAR) 76a. This signal being asserted also inhibits the generation of ACKs on the LPC bus 32 and also controls the start of a slave cycle that utilizes the BBUS 54a.

The signal DBSY is employed to indicate that a data transfer is occurring between the LPC data buffers 50a and the DBUS 42a. This data transfer may be the result of either a DMA cycle from DF(0) 40a or DF(1) 40b, or the result of the data transfer portion of a slave cycle. This signal is employed to inhibit the start of a new slave cycle.

CRBSY is employed to indicate that a DMA command read cycle is taking place on the BBUS 54a. This signal is also used to inhibit the start of a slave cycle.

Figure 14:
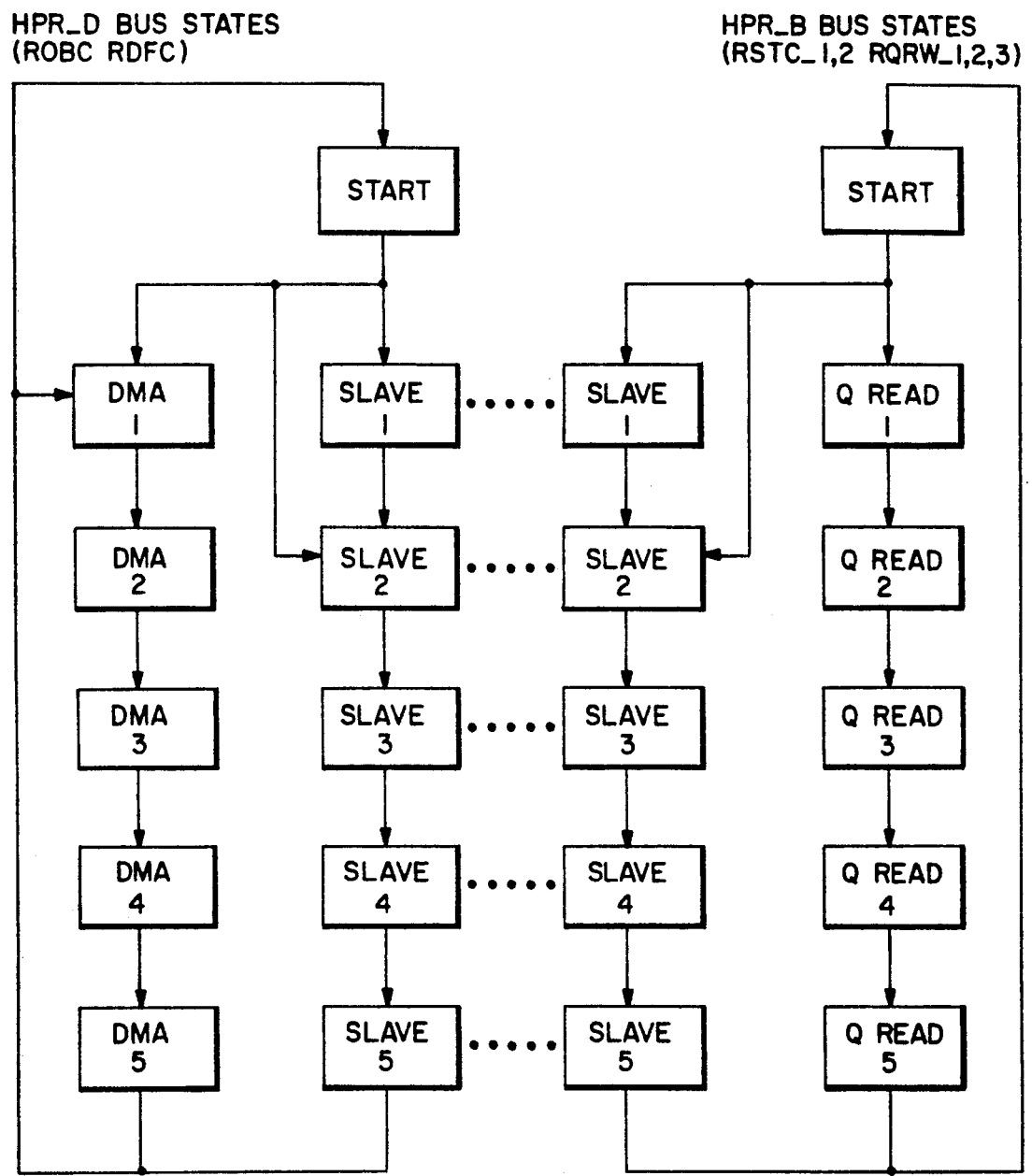
FIG. 14 depicts a state diagram of two interrelated state machines for controlling the D and B buses of FIG. 4.

As was previously stated, during a slave cycle the BBUS 54a and the DBUS 42a are coupled together through the B2D 52a buffer so as to function as one bus. During DMA transfers these two buses are decoupled by B2D 52a, with DMA data transfers taking place on the DBUS 42a and DMA command reads taking place on the BBUS 54a. All of these transfers have similar timing characteristics. All BBUS 54a transfers require 4-5 cycles, with the data being present on the BBUS 54a for at least four cycles. DMA transfers also occur in five clock cycle periods, with the data being present for four cycles. FIG. 14 illustrates two inter-related state machines for the DBUS 42a and the BBUS 54a. Each of the data path controllers in FIG. 8 implement variants of these two state machines. In FIG. 14 the states connected by dotted lines are considered to be 'locked' together and occur synchronously. All other states operate independently.

Specifically, if SLBSY is active all data path controllers go to the START state and wait until DBSY and CRBSY are no longer active. A transition is then made to either a SLAVE 1 or SLAVE 2 state, depending on whether the impending bus transaction requires four or five cycle operation. FIFO reads require five cycles while all other reads require four cycles. If SLBSY is not active then DNA data and/or DMA command read cycles may take place. The DMA cycles return to the DMA I state and repeat until a block of data is transferred.

The second set of signals referred to above is the slave address bus 100a. Three of the low order slave address bits (SA<2:0>), in conjunction with the LPC_RW (read/write) bit, are latched during the execution of a slave cycle to control the operation of the data path controllers. These signals determine the direction of the buses, which register or FIFO to read/write, and other related functions. Other slave address bus 100a signal include Advance (ADV), WIDE, and CHAN, which are indicators of FIFO access types and data widths.

Referring again to FIG. 8 a discussion is now made of the DBUS 42a controller 96a, specifically the receiver data FIFO controller (RDFC) and the receiver output buffer controller (ROBC). Both of these DBUS state machines have as inputs the signals indicated on the state bus 90a and the slave bus 100a. The ROBC has outputs for controlling the LPC data output buffer 50a (FIG. 4) and signals, such as DBSY, that indicate that the DBUS 42a is transferring data, that a DMA transfer is occurring, that the data buffer 50a is busy, and that an LPC bus 32 write cycle is required.

Figure 10:
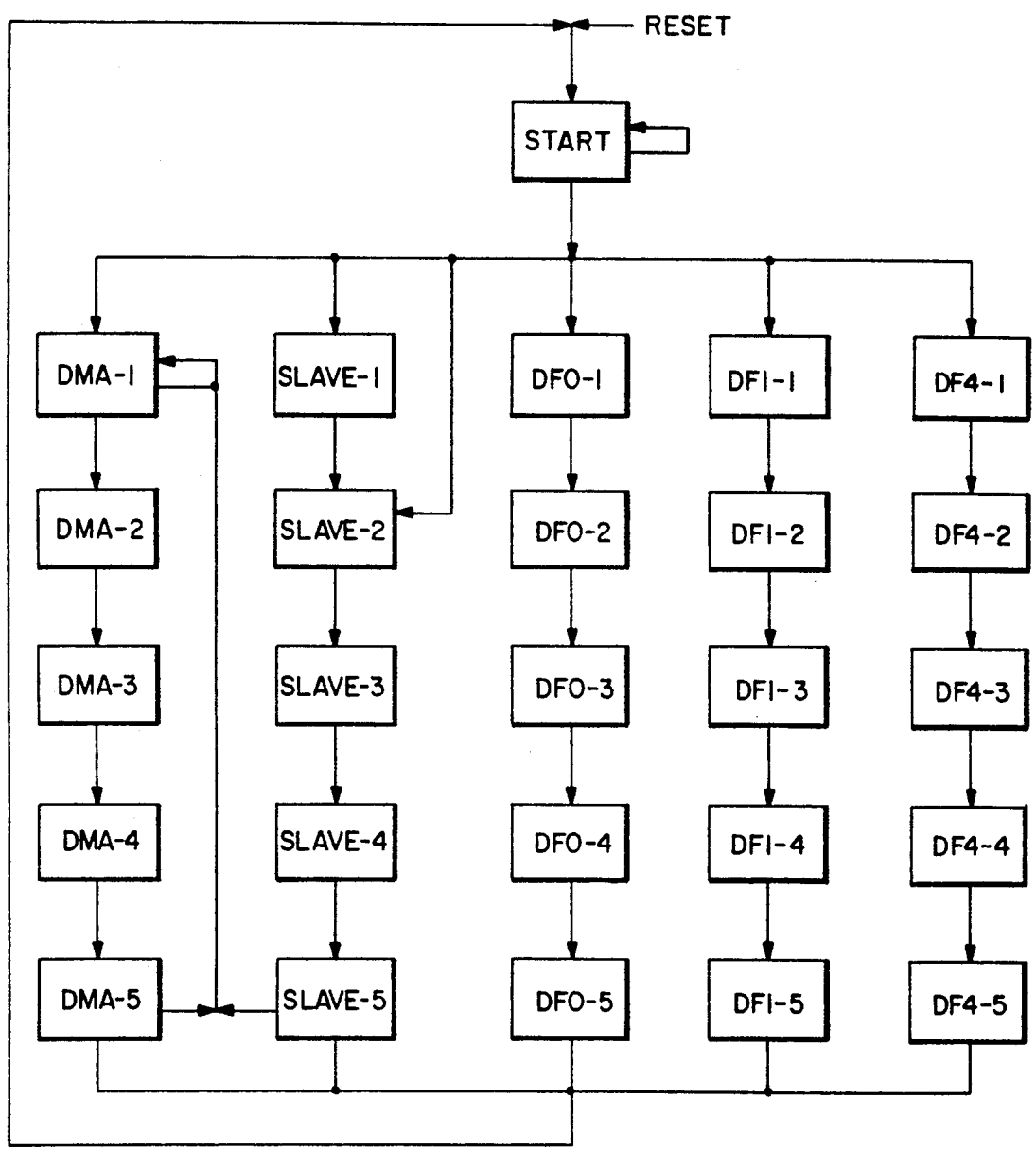
FIG. 10 depicts a state diagram implemented by the RFDC and the ROBC elements of FIG. 8.

FIG. 10 illustrates the state machine implemented by these devices. The START state is entered from a reset. If a slave read cycle is pending it waits until any DMA command read is finished (CRBSY) and the output buffer 50a is free. When these conditions occur one of the slave timing chains is entered. The DFn chains read data FIFOs 40a and 40b without advance (0) , with advance by 64 bits (1), or with advance by 256 bits (4), as determined by the value of the ADV and WIDE signals from slave bus 100. The advance function, when disabled, enables the FIFO to be read without advancing the FIFO pointer. When enabled, the advance function causes the FIFO pointer to be automatically incremented by a predetermined amount, as indicated by SIZE. The SLAVE chain is employed for all other slave read cycles, slave write cycles idle at START until SLBSY clears, if a slave operation is not pending, and if one of the channels is ready for DMA (RDMAO, RDMAL), and if DMA has been enabled (DMAEN), and if a current DMA burst has not yet finished, then the DMA chain is started at DMA-I. For this case, at DMA-1, the state machine waits for DB 50a to clear and then progresses through the chains of states. At the completion of all of the chains, if a slave operation is pending (SLBSY), or the current DMA burst has completed, the state machine returns to START. otherwise, the state machine returns to DMA-1 to complete the transfer of the current DMA burst of data to Global Memory 26.

The LPC_BIC 92a shown in FIG. 8 implements the LPC bus 32 interface control, control of the DMA address counter (AC 49a), and provides address recognition (decode) for slave cycles.

As was previously noted, a feature of the IOP 28 is the sharing of processor IDs (PIDS) between the receiver interface 28b and transmitter interface 28c. The receiver initiates two types of LPC bus 32 cycles: Global memory write cycles of DMA data, and local read reply cycles for local processor 28a slave reads.

Figure 2B:
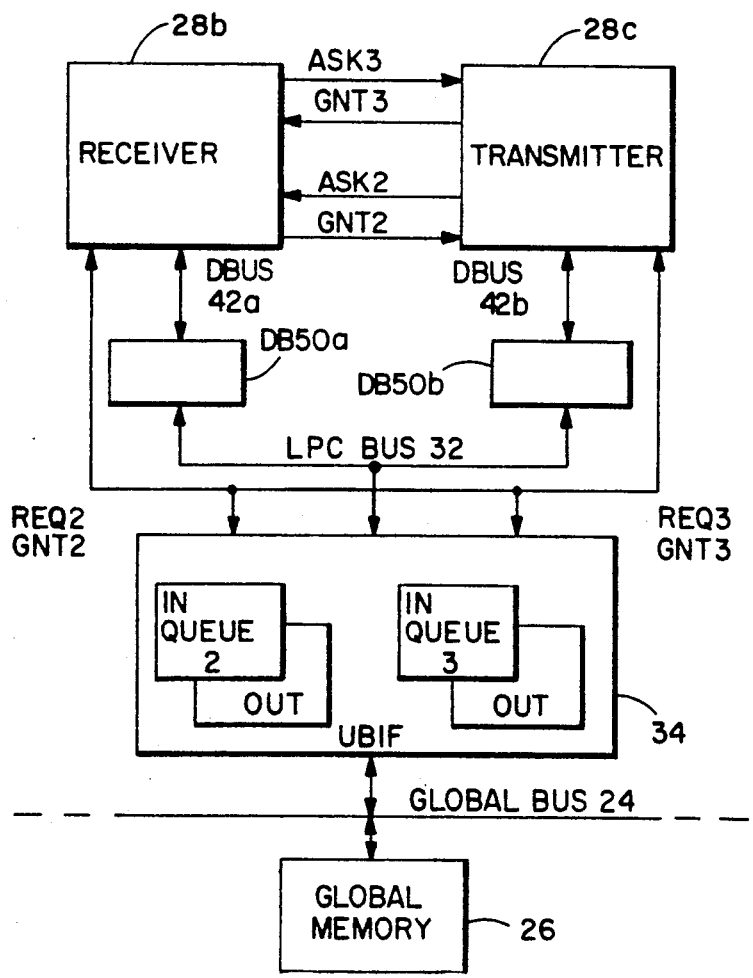

In each case the receiver interface 28b causes a LPC bus 32 write request (WREQ<2>) to be made, and holds the request active until a grant (GNT<2>) is received from the associated UBIF 34. In order to increase Global Memory 26 write bandwidth, the receiver interface 28b interleaves Global Memory 26 writes across two different local bus unit IDs. As was previously noted, the UBIF 34 maintains separate output queues for each Local bus 32 unit. That is, a separate output queue is maintained for the processor 28a, the receiver 28b, and the transmitter 28c. In accordance with a REQ/GNT/ACK protocol the UBIF 34 issues one write to the Global bus 24 each seven cycles for a given LPC bus 32 logical unit. Thus, by using two of UBIF 34 output queues, the receiver 28b achieves a five cycle write. In that the transmitter 28c does not normally require Global Memory 26 writes, the receiver 28b 'borrows' the transmitter's unit ID (PID) so as to utilize the transmitter's UBIF 34 output data queue. This interaction between the receiver 28b and transmitter 28c is controlled by a pair of signals, ASK3 and USE3, as seen in FIG. 2b. The receiver 28b asserts ASK3 requesting the transmitter 28c to make a write request to the UBIF 34 using WREQ<3>, the transmitter's write request line. The transmitter 28c waits until it is able to make the request and then asserts USE3 to the receiver 28b, along with the WREQ<3) to the UBIF 34, to inform the receiver 28b that any grant occurring on LPC bus 32 signal line PGNT<3>is for use by the receiver 28b. The transmitter removes WREQ<3>and USE3 when PGNT<3>occurs. The receiver 28b monitors the PGNT<3>signal line so as to retrieve the requested data from the UBIF 34. This mode of operation is optional under the control of the before-mentioned bit in the RDMA register (PPEN). If the bit is not set, all receiver write requests are performed using WREQ<2>. Related to the request/grant logic is a local/global control which is sampled during requests by the UBIF 34 to determine if a LPC bus 32 request is a local or a global type request. The ROBB block generates a signal to indicate that the receiver LPC data output buffer 50a is busy.

The LPC_BIC 92a is also employed for controlling the generation of DMA addresses. The DMA addresses are formed in the DAR register/counter 74a and are transferred over the A bus 58a into the AB 56a, where they are held until required for a write cycle. The DAR 74a and AB 56a are managed as a pipeline which is decoupled from the data transferred from the data FIFOs 40a and 40b to the DB 50a. In operation, the reading of a DMA command from CF(O) 48a or CF(l) 48b causes the DMA address to be loaded into the high order bits of DAR 74a, while the low order bits of DAR 74a form a counter. The address is then loaded into the AB 56a which in turn increments the DAR 74a counter such that the next DMA address is staged and ready. Each time a data word is loaded into the DB 50a and an LPC bus 32 cycle is requested, the grant of the LPC bus 32 cycle causes a new address to be loaded into AB 56a and the DAR 74a counter to be incremented. This continues until the DAR 74a counter reaches 32. At this time a new DMA command is read from one of the command FIFOs 48a or 48b and its address loaded into the DAR 74a.

RQRQ_1 and RQRW_2 implement identical state machines. RQRW_1 and RQRW_2 (for Receiver QUEUE Read/Write controller) have outputs controlling the command FIFOs 48a and 48b and status FIFOs 44a and 44b, for channels 0 and 1 respectively. These outputs are per channel:

CFREN—Command FIFO read enable
CFWEN—Command FIFO write enable
CSFOE—Command/Status FIFO shared output enable
SFREN—Status FIFO read enable
QDONE—DMA command read done Additionally, there are two outputs:

CRBSY—DMA command read busy (RQRW-L only),
DARWEN—Load DMA address register (RQRW 2 only).

Both state machines have as inputs the slave control signals: SLBSY, SA<2:0>; CHAN, ADV and RW; the DMA command read control signals: RREQ<1:0>, BUSY<1:0>, RCTC; other control signals: DBSY, OBB, FLOW; and system reset: RESET.

Figure 11:
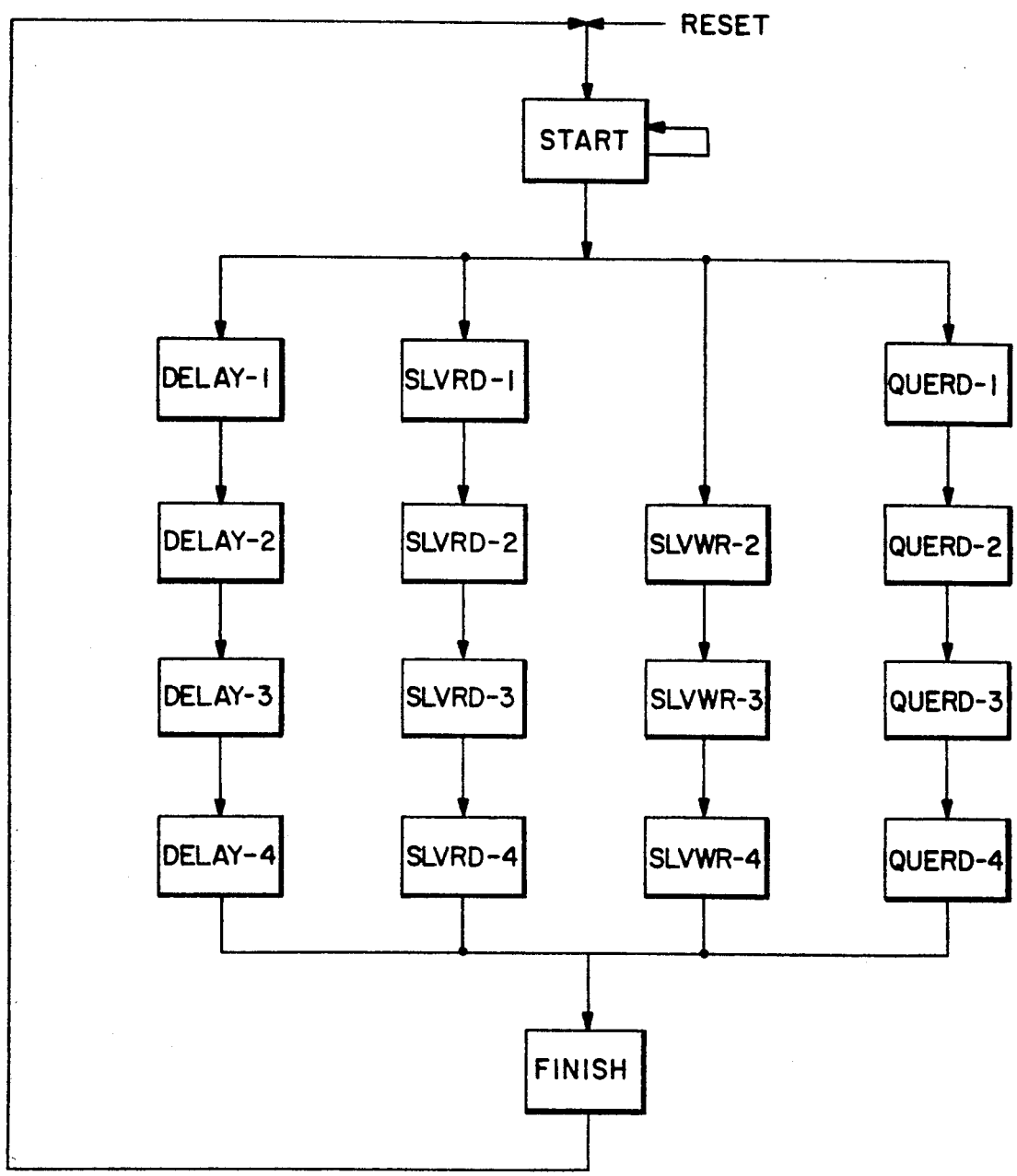
FIG. 11 depicts a state diagram implemented by a RQRW_1 and a RQRW_2 state machine of FIG. 8.

FIG. 11 shows the operation of RQRW_1 and RQRW_2 state machines. The START state is entered from reset. If a slave cycle is pending it waits until any DBUS 42a transfer (DBSY) is complete, and if it is a slave read, for the output buffer (DB 50a) to be free (OBB). For a RCF or RSF slave read the state machines go to SLVRD-1 or, for a RCF slave write, the state machines go to SLVWR-2. Otherwise, for any other slave operation the state machines idle at START. If a slave operation is not pending, and one or both of the queue read request signals (RREQ<1:0>) is active, and neither of the busy signals (BUSY<1:0>) is active, the state machines go to either the QUERD chain or to the OELAY chain. The logic is: in RQRW_1, if RREQO is active goto QUERD_1, else if RREQ1 is active goto IDLE-1. In RQRW_2, if RREQO is active goto IDLE-1, else if RREQ1 is active goto QUERD-1. Thus, if both RREQO and RREQ1 become active at the same time, with neither BUSY being active, channel 0 is given priority. If both channels are continually performing DMA, the channels interleave after the first choice.

Read enables are asserted during SLVRD-1 or QUERD-1 states. Output enables are asserted for all SLVRD or QUERD states and FINISH. Write enable is asserted during FINISH (STATE_5 for all of the chains.) For DMA command reads of CF 48a or 48b the appropriate QDONE signal is asserted during FINISH, as is DARWEN. CRBSY is asserted during all DELAY or QUERD states, and finish.

BUSY<1:0>is set by the appropriate DMA-CRS 94a channel command queue read controller (RCQC (0)

or (1)), in response to the QDONE signal, and held until the DMA burst has completed.

Figure 12:
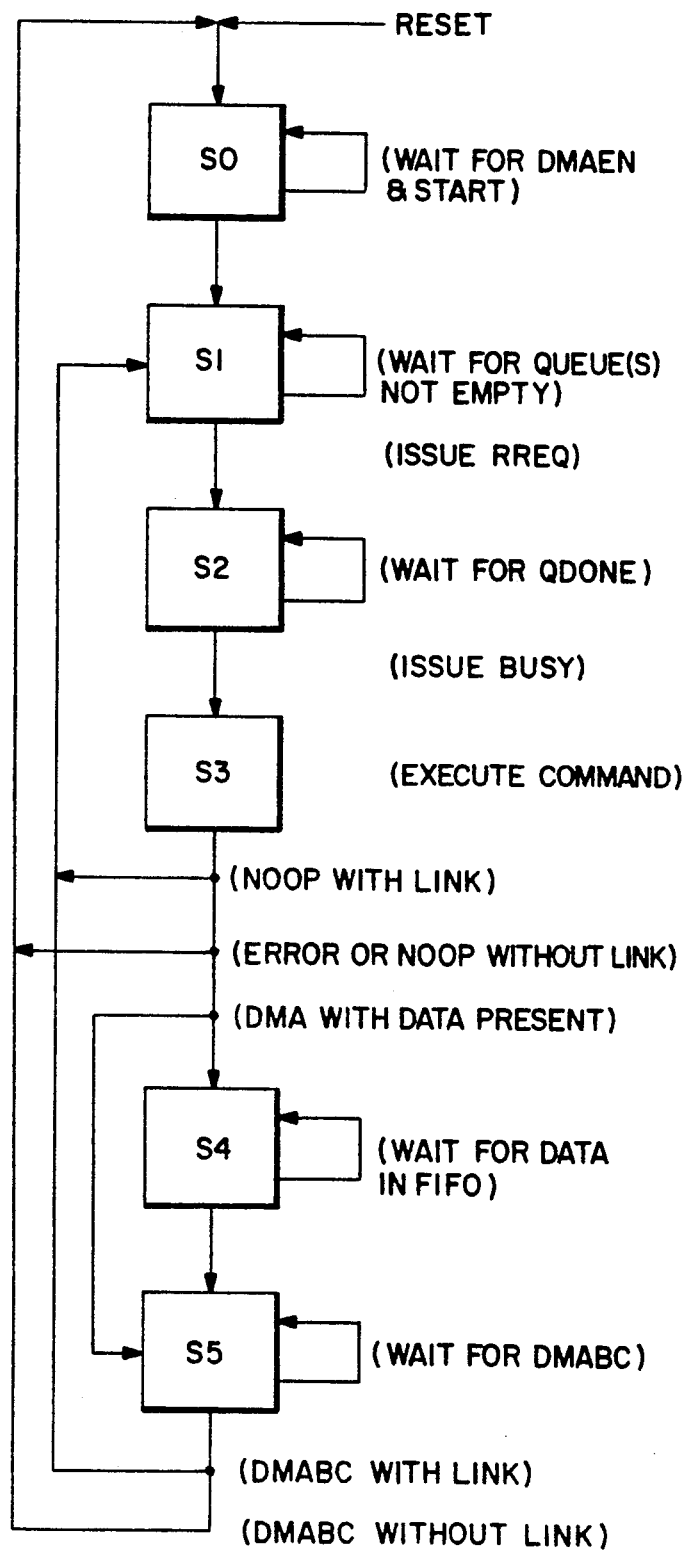
FIG. 12 illustrates the state diagram implemented by the RCQC element of the DMA_CRS state machine of FIG. 8.

In the DMA CRS 94a the RCQCs (for Receiver Command Queue Controller) have outputs for controlling the lower level queue controllers, RQRW_1 and RQRW_2 for receiver channels 0 and 1, respectively. These state machines also provide outputs to notify the bus interfaces, and DMA address generation logic, when DMA is ready. These two DMA-related state machines are also the source of DMA related interrupts. They have outputs, per channel:

INTA—Abnormal DMA interrupt
INTN—Normal DMA completion interrupt
WAIT—Software status bit in DMA 60a
RREQ—Queue read request to RQRW
RDMA—Ready for DMA to transfer controller
BUSY—Interlock to RQRW Both state machines have as inputs:
RESET—System reset
CQE—CF 48 empty flag
SQE—SF 44 empty flag
DAE—DF 40 almost empty flag
CMDEN—Channel DMA enable from RDMA
START—Channel start from RDMA
DMA—latched DMA bit in DMA command
LNK—latched LINK bit in DMA command
INT—latched INT bit in DMA command
BURST—latched BURST bit in status word
BER—latched BURST ERROR bit in status word
FLOW—FLOW bit from RDMA register
QMABC—DMA burst done from RADC
QDONE—Queue read done from RQRW FIG. 12 illustrates the state machine implemented by the RCQC elements of the DMA_CRS 94a. From reset S0 is entered, which is a quiescent state. For a START indication, with DMA enabled, for the channel in the DMA register 50a a transition is made to S1. In S1 the state machines wait for a command to be present in the DMA command queue CF 48 and, if flow mode is enabled, for a status word to be present in the HIPPI status FIFO SF 44. A transition is made to S2 for issuing a queue read request (RREQ). In S2 the state machine waits for a QDONE indication from the corresponding RQRW_1 or RQRW_2 state machine, and enters S3, setting BUSY. This prevents the RQRW state machines from performing any queue reads until the current command has completed. In S3 the DMA command is executed. Depending on the setting of the DMA, LINK, INTR bits in the command word read from CF 48, and if flow mode is enabled, and the BURST and BURST ERROR bits read from SF 44, the state machine returns to S0 or S1 if no further DMA is to be done, or returns to S4 if further DMA is to be done, and there is not yet enough data present in the DF 40. If DMA is ready, S5 is entered. At the completion of the command, from either S3 or S5, INTN is asserted if requested. If there is an error condition in S3 then INTA is asserted, and a transition is made to S0, regardless of the setting of the LINK bit. From either S3 or S4 RDMA is asserted upon going to S5, indicating that the channel is ready for DMA. The WAIT signal is asserted in those states where the RCQC state machine is waiting for a resource.

The Receiver Slave Timing Control (RSTC_1) and RSTC_2) are identical state machines and have outputs primarily for controlling slave read cycles. These include:

CSB—Clear slave busy (to RSLB)
SOBB—Set output buffer busy (to ROBB)
D2BEN—Enable D BUS to B BUS transceiver B2D 52a
IMKOE—INT 64a or MSK 66 output enable
DMAOE—DMA 60a output enable
CSROOE—CSRO 62a output enable
CSR1OE—CSRI 62b output enable RSTC_2 has outputs primarily for controlling slave write cycles. These include:

DBOE—LPC data input buffer 50a output enable
IMKWEN—INT 64a or MSK 66a write enable
DMAWEN—DMA 60a write enable
CSROWEN—CSRO 62a write enable
CSRLWEN—CSRI 62b write enable Both of the RSTC_1 and RSTC_2 state machines have as inputs the slave control signals: SLBSY, SA<2:0>, CHAN and RW; other control signals: DBSY, CRBSY, OBB; and system reset: RESET.

Figure 13:
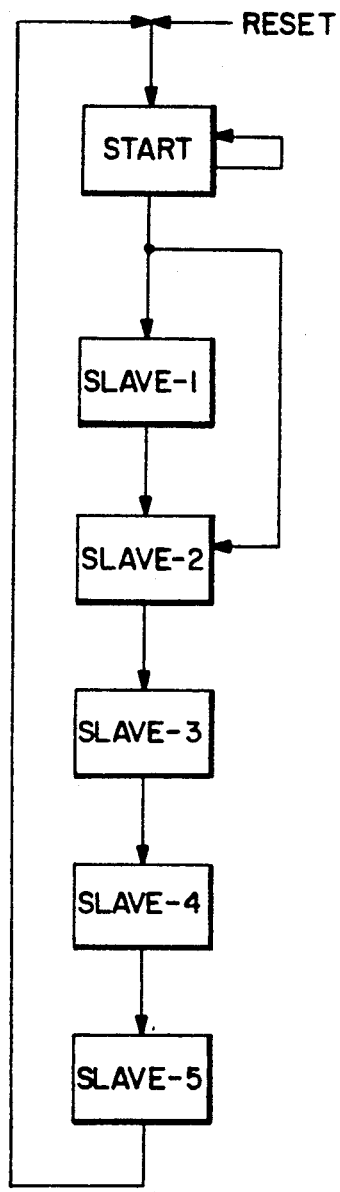
FIG. 13 depicts a state diagram implemented by a RSTC_1 and a RSTC_2 state machine of FIG. 8.

FIG. 13 shows the operation of these state machines. The START state is entered from reset. If a slave cycle is pending (SLBSY) the state machine waits for any DMA command read to be finished (CRBSY) and, if it is a slave read, for the DB 50a to be free (OBB), and for any DBUS 42a transfer in progress to be finished (DBSY). The slave cycle is then entered. For FIFO reads (e.g. DF 40, CF 48 or SF 44) the state machines start at SLAVE_1, otherwise at SLAVE-2. This is to provide an extra cycle for reading the FIFOs before outputting data for four cycles. At the end of the slave cycle the state machines return to START. During DMA, or DMA command read cycles, the state machine idles at START.

During a slave read cycle, output enables are asserted for all of the SLAVE-N states. During a slave write cycle, write enables are asserted during SLAVE-5. D2BEN, the enabling signal for D2B 52a, is asserted for all non-data FIFO operations during all SLAVE-N cycles. CSB is asserted during SLAVE-4 to inform the RSLB that the slave cycle is nearing completion. SOBB is asserted during SLAVE-1 and SLAVE-2 read cycles to inform the ROBB that the output buffer should be indicated as busy.

As was previously noted, the transmitter state machine BCSM 68b functions in a manner similar to the receiver BCSM 68a for DMA and slave read and write operations. One difference in operation is in the direction of data flow during DMA. That is, the transmitter 28c performs Global memory reads as opposed to Global memory writes. A sharing operation of the receiver 28b input queue of the UBIF 34 is also performed.

It should be noted that although the I/O Processor of the invention has been described in the context of a specific communications system and protocol (HIPPI) that the teaching of the invention may also be employed to advantage with a number of other communications systems and protocols. Furthermore, the description of the various registers and state machines is not intended to be read in a limiting sense, in that those having skill in the art may, based on the foregoing teaching, derive modifications to same while yet obtaining the same results.

Thus, while the invention has been particularly shown and described with respect to a preferred embodiment thereof, it will be understood by those skilled in the art that changes in form and details may be made therein without departing from the scope and spirit of the invention.

APPENDIX A

LPC Address Bus Signal Definitions

The LPC address bus consists of LPC_ACYCLE, LPC_ATYPE, LPC_A(31:0), LPC_LEN(3:0), LPC_PID(1:0), LPC_PTAG(7:0), LPC_RW, LPC_LOCK, and LPC_RMW. This bus is shared by the four local processors and is used to initiate global memory r/w cycles. Access to the LPC address bus is gained by issuing a read request (LPC_RREQ) or write request (LPC_WREQ) to the LPC bus arbiter and by receiving a processor grant (LPC_PGNT). A description of each address bus field is provided below:

- LPC_ACYCLE conditions a valid LPC bus local address cycle. This line is driven by the UBIF LPC bus arbiter to validate local LPC bus addresses. It is used by local LPC bus devices, such as the HIPPI I/O interfaces on the I/O processor card to validate LPC addresses. LPC_ACYCLE is valid for one cycle during the first half of an LPC ABUS cycle, indicating that a valid LPC bus address cycle can be sampled on the following rising clock edge.

- LPC_ATYPE specifies a valid LPC address bus cycle or IPC interrupt cycle. If LPC_ATYPE = 1, the LPC address bus specifies a valid r/w request. If LPC_ATYPE = 0, the LPC bus identifies an IPC interrupt cycle. In this case, the UBIF interprets LPC_LEN(3:0) as the group select identifier, GSI(3:0), and LPC_A(31:0) as the processor select mask, PSM(31:0). During IPC interrupt cycles, LPC_RW, LPC_LOCK, and LPC_RMW are not defined.

- LPC_A(31:0) specifies the 32-byte block address during LPC r/w request cycles, thus providing a physical address range of 128 GB. During IPC interrupt cycles (LPC_ATYPE = 0), LPC_A(31:0) specifies the processor select mask.

- LPC_LEN(3:0) indicates the block length during LPC read request cycles. Typically, processors issue single-word read request cycles (i.e., LPC_LEN(3:0) = 0). However, block-read cycles are supported by indicating a non-zero block length during LPC read request cycles. The corresponding block address must indicate a valid starting block address for correct operation, and reply data is returned in proper order. The block length is specified in powers of two, where LPC_LEN(3:0) = 0,1,2,...,16 indicate block lengths of 1,2,4,...,2**16 respectively. The current limitation imposed by the UBIF is a block length of eight 256-bit words (or LPC_LEN(3:0) = 3) per local device. During IPC interrupt cycles (LPC_ATYPE = 0), LPC_LEN(3:0) specifies the processor group select.

- LPC_PID(1:0) indicates the requesting processor identifier (PID) during LPC r/w request cycles. On a read request cycle, the PID is saved by address consumers (i.e., global memory cards) and later returned along with the corresponding reply data as LPC_MID(1:0) to uniquely identify the destination processor. On a write request cycle, the PID is used by global memory cards to complete a decoupled, lock-read/lock-write cycle by a given processor, thus preventing any other processor from performing any memory r/w operation to the locked global memory bank. On the processor and IOP cards, the global bus processor identifier, LPC_PID(7:0), is composed by concatenating GB_UNITID(1:0), GB_CARDID(3:0), with the given LPC bus LPN(1:0).

- LPC_PTAG(7:0) is used by processors to uniquely tag multiple outstanding read requests. Like PID, PTAG is saved by address consumers and later returned along with the corresponding reply data as LPC_MTAG(7:0). Since read requests to different memory banks can return in arbitrary order, PTAG can optionally be used by processors to re-organize data when issuing multiple outstanding read requests.

- LPC_RW specifies a read (1) or write (0) cycle during valid LPC request cycles.

- LPC_LOCK conditions the current LPC r/w cycle. When inactive, it indicates a normal r/w cycle. When active, it indicates a decoupled, atomic r/w cycle. In global memory mode 0, read-lock cycle requests data from global memory and causes the affected global memory address to be locked until a subsequent write-unlock cycle is performed by the same processor that issued the read-lock cycle. This prevents any other processor from performing any r/w operation to the locked global memory address, thus supporting atomic global memory operations (e.g., test-and-set, compare-and-swap, fetch-and-add, etc.). In global memory mode 1, a read-lock cycle causes an atomic test-and-set operation at the global memory. The global memory returns the data at the specified address and then writes all 1's to the entire 256-bit word.

- LPC_RMW identifies a partial global memory write cycle, which requires a read-modify-write operation at the global memory bank. LPC_RMW should be active whenever any of the eight 32-bit data slices contains partially written data.

LPC Data Bus Signal Definitions

The data bus consists of LPC_DCYCLE, LPC_D(255:0), LPC_BE(31:0), LPC_MID(7:0), LPC_MTAG(7:0) LPC_GBPERR, LPC_ECCERR and LPC_ERRTYPE. This bus is used by processors to transfer write data to the UBIF or by the UBIF to return global memory data to processors. Processors gain access to the LPC data bus by issuing a LPC_WREQ to the LPC bus master arbiter and receiving a LPC_PGNT. A description of each data bus field is provided below:

- LPC_DCYCLE conditions a valid LPC bus data cycle. This line is driven by the UBIF LPC bus data arbiter to validate LPC bus reply cycles. Data consumers should validate read reply cycles with LPC_DCYCLE. LPC_DCYCLE is valid for one cycle during the first half of an LPC DBUS cycle.

- LPC_D(255:0) is the data bus. Each of the thirty-two data bytes may contain valid data, as indicated by the byte enables LPC_BE(31:0).

- LPC_BE(31:0) are the individual byte enables. LPC_BE(0) active indicates valid data on LPC_D(7:0), LPC_BE(1) active indicates valid data on LPC_D(15:8), etc. During write operations, LPC_BE(31:0) validate each of the thirty-two data bytes on LPC_D(255:0). LPC_BE(31:0) are not defined during read reply cycles, since global memory read operations always return 256-bits of data.

- LPC_MID(7:0) carries the returned processor ID during global memory reply operations indicating the destination processor for the given data. LPC_MID(1:0) reflects the value presented on LPC_PID(1:0) during the corresponding read cycle. LPC_MID(1:0) is inactive during processor write cycles.

- LPC_MTAG(7:0) carries the returned processor TAG during global memory reply operations. This field is optionally used by processors to re-organize global memory reply data when issuing multiple outstanding read requests. LPC_MTAG(7:0) reflects the value presented on LPC_PTAG(7:0) during the corresponding read cycle. LPC_MTAG+(7:0) is inactive during processor write cycles.

- LPC_NOCACHE inhibits buffering of the returned data. This is returned by memory devices along with reply data to indicate that the data is volatile and should not be buffered or cached. The UBIF returns LPC_NOCACHE to the destination processor along with the reply data.

- LPC_ECCERR, LPC_ERRTYPE reports the result of a global memory read operation. If LPC_ERRTYPE is active, then LPC_ERRTYPE indicates a corrected, single-bit error (if 0) or an uncorrectable, double-bit error (if 1). These signals are inactive during processor write cycles.

- LPC_GBPERR reports if bad parity was detected on the global bus data lines LPC_D(255:0) during the memory read reply cycle. It is only valid during UBIF to PBIF data reply cycles and should be ignored at all other times.

LPC Control Bus Signal Definitions

The LPC control bus consists of LPC_ACK and LPC_NAK. These shared signals are used to acknowledge a valid LPC address and to indicate whether LPC bus requests are accepted or rejected. LPC_ACK and LPC_NAK are returned two cycles after a valid LPC address bus cycle has been issued to a recognized LPC address. The UBIF always returns LPC_ACK when processors issue global memory r/w requests, as indicated by conditioning an LPC_RREQ or LPC_WREQ with an active (i.e., 0) LPC_LG indication. An invalid LPC address is indicated by the absence of both LPC_ACK and LPC_NAK, which implies that processors should abort the request. A description of each control bus signal is provided below:

- LPC_ACK is returned by an address consumer to indicate that it has acknowledged a valid LPC address and that is has accepted the given r/w request. The UBIF always returns LPC_ACK when given a global address since the UBIF local bus arbiter only grants the LPC bus if there is room in the associated output queue to buffer the global bus request. However, local devices on the I/O processor card may not return LPC_ACK, either because of an unrecognized address or because they cannot accept the given request.

- LPC_NAK is returned by an address consumer to indicate that is has acknowledged a valid LPC address but that is has not accepted the r/w request. The requestor should retry a NAKed cycle.

LPC Bus Arbitration Signal Definitions

The LPC bus arbitration control signals consist of LPC_RREQ(3:0), LPC_WREQ(3:0), LPC_LG(3:0), and LPC_RDY(3:0). Each of the four local processors has a unique set of these control signals, thus processor (i) is given LPC_RREQ(i), LPC_WREQ(i), LPC_LG(i), and LPC_RDY(i). LPC_RREQ(i), LPC_WREQ(i), and LPC_LG(i) are used to gain access of the LPC bus to issue local or global r/w requests, while LPC_RDY(i) is used by the UBIF-D chip to pace the return of global memory block read data to each local processor. These signals are described in more detail below. A description of each arbitration signal is provided below:

- LPC_RREQ(3:0) are the unique processor read request signals. These are used to gain access to the LPC address bus to issue a local or global read request. LPC_LG(3:0) indicates whether the request is destined for a local device (1) or a global device (0). LPC_RREQ(i) should be generated on the rising edge of LPC_CLOCK and remain asserted until LPC_PGNT(i) is received.

- LPC_WREQ(3:0) are the unique processor write request signals. These are used to gain access to both the LPC address bus and LPC data bus to issue a local or global write request. LPC_LG(3:0) indicates whether the request is destined for a local device (1) or a global device (0). LPC_WREQ(i) should be generated on the rising edge of LPC_CLOCK and remain asserted until LPC_PGNT(i) is received.

- LPC_LG(3:0) are the unique processor +Local/-Global select signals. These are used to condition whether the current LPC_RREQ(i) or LPC_WREQ(i) is destined for a local device (1) or a global device (0). The timing of LPC_LG(i) is identical to LPC_RREQ(i) and LPC_WREQ(i).

- LPC_PGNT(3:0) are the unique processor bus grant signals. During any given LPC bus cycle, only one LPC_PGNT(i) is issued by the LPC bus arbiter. LPC_PGNT(i) is returned no sooner than one cycle after detecting a LPC_RREQ(i) or LPC_WREQ(i) and remains active for two clock cycles. LPC_PGNT(i) should be used directly to enable the LPC address bus drivers on a given processor. If a LPC_WREQ(i) was issued, then the processor should begin driving the LPC data bus one cycle after detecting LPC_PGNT(i). The LPC bus arbiter always deasserts LPC_PGNT(i) after two cycles, but may assert the same LPC_PGNT(i) one cycle later if the corresponding processor keeps LPC_RREQ(i) or LPC_WREQ(i) asserted. Thus, any given processor is granted the LPC bus at most every other LPC bus cycle.

- LPC_RDY(3:0) are the unique processor ready signals. LPC_RDY(i) indicates to the UBIF that the processor is ready to accept read data. These are used primarily during block-read cycles to pace the rate at which a local processor or I/O device (e.g., the HIPPI transmitter on the I/O processor card) accepts global memory read data. The UBIF returns data to a device at a peak data rate of 320 MB/second, assuming 40 MHz and no bus contention. The local processor or I/O device interface can slow this rate by taking away LPC_RDY(i) upon receiving a data word.

Interrupt Message Support Signal Definitions

- LPC_IPCINTR(3:0) are the unique IPC interrupt signals. These are generated by the UBIF whenever it detects an IMSG cycle on the global bus which selects any of the four local processors. The UBIF generates a one-clock-cycle long LPC_IPCINTR(i) signal, which should be used by the PBIF chip to set the IPC interrupt bit in the processor interrupt register. The UBIF can issue back-to-back LPC_IPCINTR(i) signals, should there be back-to-back IMSG cycles that select the processor (i).

Local Processor Card (LPC) Bus Signal Summary

| Signal Name | Width | Description | Type |
|---|---|---|---|
| -LPC ACYCLE | 1 | Address cycle indicator | TP |
| LPC ATYPE | 1 | +Address/-/message select | TS |
| LPC A | 32 | Address bus (32-byte block address) | TS |
| LPC LEN | 4 | Block length | TS |
| LPC PID | 2 | Processor request ID | TS |
| LPC PTAG | 7 | Processor request TAG | TS |
| LPC RW | 1 | +Read/-Write select | TS |
| LPC LOCK | 1 | Atomic cycle select | TS |
| LPC RMW | 1 | Read-modify-write signal | TS |
| -LPC DCYCLE | 1 | Data cycle indicator | TP |
| LPC D | 256 | Data bus | TS |
| LPC BE | 32 | Byte Enables | TS |
| LPC MID | 2 | Memory reply ID | TS |
| LPC MTAG | 7 | Memory reply TAG | TS |
| LPC ECCERR | 1 | ECC error signal | TS |
| LPC ERRTYPE | 1 | ECC error type (0=CECC, 1=UECC) | TS |
| LPC NOCACHE | 1 | Don't cache | TS |
| LPC GBPERR | 1 | GigaBus parity error | TS |
| -LPC ACK | 1 | Bus acknoledge | TS |
| -LPC NAK | 1 | Bus no-acknoledge | TS |
| Total | 354 | The following signals are unique per processor | |
| LPC LG | 1 | +Local/-Global indicator | TP |
| -LPC RREQ | 1 | LPC read request | TP |
| -LPC WREQ | 1 | LPC write request | TP |
| -LPC PGNT | 1 | LPC bus processor grant | TP |
| -LPC RDY | 1 | Processor ready indicator | TP |
| -LPC IPCINTR | 1 | Interrupt message interrupt | TP |
| +LPC ETCLK | 2 | ECL System clock | ECL |
| -LPC ETCLK | 2 | ECL System clock | ECL |
| Total | 344 | The following signals are daisy chained | |
| LPC SIN | 1 | Diagnostic bus serial in | TP |
| LPC SOUT | 1 | Diagnostic bus serial out | TP |
| Total | 2 | The following signals form the GigaBus snoop bus | |
| LPC GB BACKOFF | 1 | GigaBus backoff signal | TP |
| LPC GB ACYCLE | 1 | GigaBus address cycle | TP |
| LPC GB ATYPE | 1 | GigaBus +address/-message select | TP |
| LPC GB RW | 1 | GigaBus Read/-Write select | TP |
| LPC GB LEN | 4 | GigaBus block length | TP |
| LPC GB A | 32 | GigaBus address | TP |
| -LPC RESET | 1 | Synchronous system reset | TP |

Having thus described my invention, what I claim as new, and desire to secure by Letters Patent is:

1. Communication apparatus for coupling to a communications channel for receiving information therefrom, the information including data information and structure information for indicating an organization of the data information, comprising:

means for coupling to the communications channel for receiving the information therefrom;

first means, having an input coupled to an output of the receiving means, for storing the received data information without regard for the organization of the received data information;

second means, having an input coupled to an output of the receiving means, for storing the received structure information;

third means for storing information that specifies a type of operation for individual ones of a plurality of direct memory access commands, including information for specifying a destination address for the received data information and further including information for specifying that two DMA commands are to be executed one after the other without interruption; and means, responsive to the information stored within said third means, for controlling the execution of individual ones of the DMA commands for transferring received data information from said first means to the specified destination address.

2. Communication apparatus as set forth in claim 1 wherein the receiving means includes means for coupling to a bit parallel communications channel for receiving the data information therefrom, and wherein the receiving means further includes means for coupling to a plurality of communications channel signal lines for receiving the structure information therefrom.

3. Communication apparatus as set forth in claim 2 wherein the plurality-of communications channel signal lines include:

a PACKET signal line for indicating, when first asserted, a START OF PACKET (SOP) condition wherein one or more BURSTs of data information are to be transferred over the bit parallel communications channel, and for indicating, when first deasserted, an END OF PACKET (EOP) condition wherein no further BURSTs are to be transferred; and a BURST signal line for indicating, when first asserted, that a BURST comprised of one or more words of data information are to be transferred over the bit parallel communications channel, and wherein the second storing means stores the SOP, BURST, and EOP indications.

4. Communication apparatus as set forth in claim 3 wherein there is received, for each BURST, information indicating a number of data words that comprise the BURST, and wherein the second storing means further stores, in association with each stored BURST indication, the information that indicates the number of data words that comprise the BURST.

5. Communication apparatus as set forth in claim 3 wherein the receiving means includes means for verifying an integrity of the received data information for each BURST, and wherein the second storing means further stores, in association with each stored BURST indication, information that indicates the integrity of the stored data information that was received during the BURST.

6. Communication apparatus for coupling to a communications channel for transmitting information thereto, the information including data information and structure information for indicating an organization of the data information, comprising:

means for coupling to the communications channel for transmitting the information thereto;

first means, having an output coupled to an input of the transmitting means, for storing the data information, prior to transmission thereof, without regard for the organization of the data information;

second means, having an output coupled to an input of the transmitting means, for storing the structure information prior to the transmission thereof;

third means for storing information that specifies a type of operation for individual ones of a plurality of direct memory access (DMA) commands, including information for specifying a source address of the data information and further including information for specifying that two DMA commands are to be executed one after the other without interruption; and means, responsive to the information stored within said third means, for controlling the execution of individual ones of the DMA commands for transferring the data information from the source address to said first means for storage therein.

7. Communication apparatus as set forth in claim 6 wherein the transmitting means includes means for coupling to a bit parallel communications channel for transmitting the data information thereto, and wherein the transmitting means further includes means for coupling to a plurality of communications channel signal lines for transmitting the structure information thereto.

8. Communication apparatus as set forth in claim 7 wherein the plurality of communications channel signal lines include:

a PACKET signal line for indicating, when first asserted, a START OF PACKET (SOP) condition wherein one or more BURSTs of data information are to be transferred over the bit parallel communications channel, and for indicating, when first deasserted, an END OF PACKET (EOP) condition wherein no further BURSTs are to be transferred; and a BURST signal line for indicating, when first asserted, that a BURST comprised of one or more words of data information are to be transferred over the bit parallel communications channel, and wherein the second storing means stores the SOP, BURST, and EOP indications.

9. Communication apparatus as set forth in claim 8 wherein there is transmitted, for each BURST, information indicating a number of data words that comprise the BURST, and wherein the second storing means further stores, in association with each stored BURST indication, the information that indicates the number of data words that comprise the BURST.

10. Communication apparatus as set forth in claim 8 wherein the second storing means further stores, in association with each stored SOP, EOP, and BURST indication, information that specifies that the associated stored indication, and that an immediately subsequent stored indication, are to be executed in sequence by the transmitting means.

11. Communication apparatus for coupling to a communications channel for transmitting information thereto or for receiving information therefrom, comprising:

means for interfacing the communication apparatus to a communications channel;

means for interfacing the communication apparatus to a data processing bus including data, address, and control signals lines;

first communication apparatus internal data bus means coupled to the data signal lines of the data processing bus through first buffer means, the first communication apparatus internal data bus means having data storage means coupled thereto for storing data received from or transmitted to the communications channel;

second communication apparatus internal data bus means coupled to the first communication apparatus internal data bus means through second buffer means, the second communication apparatus internal data bus means having at least one logical unit coupled thereto, said at least one logical unit storing information specifying the operation of direct memory access (DMA) bus cycles for transferring information to or from the data signal lines of the data processing bus and the data storage means; and control means having inputs responsive to the information stored within the at last one logical unit and an output coupled to the second buffer means for causing, (a) the second buffer means to isolate, during DMA bus cycles, the first communication apparatus internal data bus means from the second communication apparatus internal data bus means, and (b) for causing the second buffer means to couple together, during non-DMA bus cycles, the first communication apparatus internal data bus means and the second communication apparatus internal data bus means so as to enable access to the at least one logical unit from the data processing bus.

12. Communication apparatus as set forth in claim 11, wherein said at least one logical unit includes first data storage means for storing information specifying at least one DMA command, the information specifying at least a portion of an address of a data storage location within a data processing memory that is coupled to the data signal lines of the data processing bus, the information further specifying a number of times that the at least one DMA command is to be executed.

13. Communication apparatus as set forth in claim 12 wherein the information further selectively specifies whether an execution of the at least one DMA command is to be linked to a second DMA command such that the at least one DMA command and the second DMA command are executed in sequence and without interruption.

14. Communication apparatus as set forth in claim 12 wherein the communications channel includes a plurality of signal lines that include:
a PACKET signal line for indicating, when first asserted, a START OF PACKET (SOP) condition wherein one or more BURSTs of data information are to be transferred over a communications channel data path, and for indicating, when first deasserted, an END OF PACKET (EOP) condition wherein no further BURSTs are to be transferred; and
a BURST signal line for indicating, when first asserted, that a BURST comprised of one or more words of data information are to be transferred over the communications channel data path, and wherein
the at least one logical unit further includes second data storage means for storing SOP, BURST, and EOP indications that are associated with data stored within the data storage means that is coupled to the first communication apparatus internal data bus means.

15. Communication apparatus as set forth in claim 14 wherein the at least one DMA command further includes information for linking the execution of the command to indications stored within the second data storage means.

16. Communications apparatus as set forth in claim 11 wherein the means for interfacing the communication apparatus to a communications channel includes a receiver interface and a transmitter interface, wherein the data processing bus has means coupled thereto for providing an input data queue and an output data queue for the receiver interface and an input data queue and an output data queue for the transmitter interface, and wherein the communications apparatus further includes means for temporarily assigning the output data queue of the transmitter interface to the receiver interface and for temporarily assigning the input data queue of the receiver interface to the transmitter interface.

17. A method for use with communication apparatus coupled to a communications channel for receiving information therefrom, the information including data information and structure information for indicating an organization of the data information, the method comprising the steps of:
storing a plurality of direct memory access (DMA) commands within a command storage means, each stored DMA command being capable of having a LINK indication asserted;
establishing a connection with transmitter means that is coupled to the communications channel for receiving information from the transmitter means over the communications channel;
receiving the information over the communications channel, the step of receiving including the steps of:
storing within a first memory means the received data information;
storing within a second memory means the received structure information; and
during the execution of the step of receiving, reading the command storage means and transferring the received data information from the first memory means to a system memory means in accordance with the stored DMA commands; and
for a stored DMA command having an asserted LINK indication, beginning the execution of a next stored DMA command upon a completion of the stored DMA command having the asserted LINK indication.

18. A method as set forth in claim 17 wherein the communications channel has a plurality of communications channel signal lines that include:
a PACKET signal line for indicating, when first asserted, a START OF PACKET (SOP) condition wherein one or more BURSTs of data information are to be transferred over a data bus of the communications channel, and for indicating, when first deasserted, an END OF PACKET (EOP) condition wherein no further BURSTs are to be transferred; and
a BURST signal line for indicating, when first asserted, that a BURST comprised of one or more words of data information is to be transferred over the communications channel data bus, and wherein the second memory means stores the SOP, BURST, and EOP indications.

19. A method as set forth in claim 18 wherein there is received, for each BURST, information indicating a number of data words that comprise the BURST, and wherein the second memory means further stores, in association with each stored BURST indication, the information that indicates the number of data words that comprise the BURST.

20. A method as set forth in claim 18 wherein the step of receiving includes a step of verifying an integrity of the received data information for each BURST, and wherein the second memory means further stores, in association with each stored BURST indication, information that indicates the integrity of the stored data information that was received during the BURST.

21. A method for use with communication apparatus coupled to a communications channel for transmitting information thereto, the information including data information and structure information for indicating an organization of the data information, the method comprising the steps of:
storing a plurality of direct memory access (DMA) commands within a command storage means, each stored DMA command being capable of having a LINK indication asserted;
establishing a connection with receiver means that is coupled to the communications channel for transmitting information thereto;
transmitting the information to the communications channel, the step of transmitting including the steps of,
reading from a first memory means the data information to be transmitted;

reading, from a second memory means, structure information associated with the data information read from the first memory means;

organizing the transmission of the data information in accordance with the structure information; and during the execution of the step of transmitting, reading the command storage means and transferring data information to the first memory means from a system memory means in accordance with the stored DMA commands; and for a stored DMA command having an asserted LINK indication, beginning the execution of a next stored DMA command upon a completion of the stored DMA command having the asserted LINK indication.

22. A method as set forth in claim 21 wherein the communications channel has a plurality of communications channel signal lines that include:

a PACKET signal line for indicating, when first asserted, a START OF PACKET (SOP) condition wherein one or more BURSTs of data information are to be transferred over a data bus of the communications channel, and for indicating, when first deasserted, an END OF PACKET (EOP) condition wherein no further BURSTs are to be transferred; and a BURST signal line for indicating, when first asserted, that a BURST comprised of one or more words of data information is to be transferred over the communications channel data bus, and wherein the second memory means stores the SOP, BURST, and EOP indications.

23. A method as set forth in claim 22 wherein there is transmitted, for each BURST, information indicating a number of data words that comprise the BURST, and wherein the second memory means further stores, in association with each stored BURST indication, information that indicates the number of data words that comprise the BURST.

24. Input/Output (I/O) apparatus for use in a data processing system of the type having a system bus, a system memory coupled to the system bus, and at least one data processor coupled to the system bus, the I/O apparatus comprising:

an I/O control processor;

system bus interface means for coupling the I/O apparatus to the system bus;

a local bus coupled between said I/O control processor and said system bus interface means;

means for interfacing to at least one communications channel, said means for interfacing to at least one communications channel including at least one receiver interface and at least one transmitter interface, wherein said system bus interface means includes means for providing an input data queue and an output data queue for the receiver interface and an input data queue and an output data queue for the transmitter interface, and wherein said I/O apparatus further includes means for temporarily assigning the output data queue of the transmitter interface to the receiver interface and for temporarily assigning the input data queue of the receiver interface to the transmitter interface.

25. Input/Output (I/O) apparatus for use in a data processing system of the type having a system bus, a system memory coupled to the system bus, and at least one data processor coupled to the system bus, the I/O apparatus comprising:

an I/O control processor;

system bus interface means for coupling the I/O apparatus to the system bus;

a local bus coupled between said I/O control processor and said system bus interface means;

means for interfacing to at least one communications channel, said means for interfacing to at least one communications channel including at least one receiver interface and at least one transmitter interface, wherein said system bus interface means includes means for providing an input data queue and an output data queue for the receiver interface and an input data queue and an output data queue for the transmitter interface, and wherein said I/O apparatus further includes means for temporarily assigning the output data queue of the transmitter interface to the receiver interface and for temporarily assigning the input data queue of the receiver interface to the transmitter interface;

and wherein said means for interfacing to at least one communications channel further includes;

first internal bus means that is coupled to said local bus through first buffer means, the first internal bus means having data storage means coupled thereto for storing data received from or transmitted to the at least one communications channel;

second internal bus means that is coupled to the first internal bus means through second buffer means, the second internal bus means having at least one logical unit coupled thereto, said at least one logical unit storing information specifying the operation of direct memory access (DMA) bus cycles for transferring information to or from the local bus and the data storage means; and control means having inputs responsive to the information stored within the at least one logical unit and an output coupled to the second buffer means for causing, (a) the second buffer means to isolate, during DMA bus cycles, the first internal bus means from the second internal bus means, and (b) for causing the second buffer means to couple together, during non-DMA bus cycles, the first internal bus means and the second internal bus means so as to enable access to the at least one logical unit by the control data processor.

26. I/O apparatus as set forth in claim 25 wherein said at least one logical unit includes command storage means for storing information specifying at least one DMA command, the information specifying at least a portion of an address of a data storage location within the system memory, the information further specifying a number of times that the at least one DMA command is to be executed.

27. I/O apparatus as set forth in claim 26 wherein the information further selectively specifies whether an execution of the at least one DMA command is to be linked to a second DMA command such that the at least one DMA command and the second DMA command are executed in sequence and without interruption.

28. I/O apparatus as set forth in claim 25 wherein the at least one communications channel has a plurality of signal lines that include:

a PACKET signal line for indicating, when first asserted, a START OF PACKET (SOP) condition wherein one or more BURSTs of data information are to be transferred over a communications channel data path, and for indicating, when first deasserted, an END OF PACKET (EOP) condition wherein no further BURSTs are to be transferred; and a BURST signal line for indicating, when first asserted, that a BURST comprised of one or more words of data information are to be transferred over the communications channel data path, and wherein the communications channel interface means further includes second data storage means for storing at least a set of SOP, BURST, and EOP indications that are associated with data stored within the data storage means.

29. I/O apparatus as set forth in claim 28 wherein the at least one DMA command further includes information for linking the execution of the DMA command to indications stored within the second data storage means.

30. I/O apparatus as set forth in claim 26 wherein the information stored within said command storage means further specifies for each of the DMA commands if said I/O control processor is to be interrupted at a completion of the command.

31. I/O apparatus as set forth in claim 28 wherein said second data storage means is capable of storing link indications, and wherein said I/O apparatus further includes means that is responsive to stored link indications for transmitting a plurality of packets without interruption.

* * * * *